US012578180B2

(12) United States Patent
Liang

(10) Patent No.: US 12,578,180 B2
(45) Date of Patent: Mar. 17, 2026

(54) INTERFEROMETRIC SYSTEM WITH DEEP LEARNING ALGORITHM TO PROCESS TWO INTERFEROGRAMS

(71) Applicant: Arizona Board of Regents on Behalf of the University of Arizona, Tucson, AZ (US)

(72) Inventor: Rongguang Liang, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 192 days.

(21) Appl. No.: 18/555,423

(22) PCT Filed: Apr. 15, 2022

(86) PCT No.: PCT/US2022/025005
§ 371 (c)(1),
(2) Date: Oct. 13, 2023

(87) PCT Pub. No.: WO2022/221655
PCT Pub. Date: Oct. 20, 2022

(65) Prior Publication Data
US 2024/0210158 A1      Jun. 27, 2024

Related U.S. Application Data

(60) Provisional application No. 63/175,729, filed on Apr. 16, 2021.

(51) Int. Cl.
*G01B 9/02* (2022.01)
*G01B 9/02001* (2022.01)
(Continued)

(52) U.S. Cl.
CPC ..... *G01B 9/02087* (2013.01); *G01B 9/02007* (2013.01); *G01B 9/04* (2013.01);
(Continued)

(58) Field of Classification Search
CPC ........... G01B 9/02087; G01B 9/02007; G01B 9/02005; G01B 9/02028; G01B 9/02048;
(Continued)

(56) References Cited

U.S. PATENT DOCUMENTS

2004/0252310 A1* 12/2004 De Lega ............ G01B 9/02057
356/511
2007/0024860 A1    2/2007  Tobiason et al.
(Continued)

FOREIGN PATENT DOCUMENTS

WO        2021/222464 A1    11/2021

OTHER PUBLICATIONS

K. Yan, Y. Yu, T. Sun, A. Asundi, and Q. Kemao, "Wrapped phase denoising using convolutional neural networks," Optics and Lasers in Engineering 128, 105999 (2020) (Year: 2020).*
(Continued)

*Primary Examiner* — Tarifur R Chowdhury
*Assistant Examiner* — Jonathon Cook
(74) *Attorney, Agent, or Firm* — Perkins Coie LLP

(57)          ABSTRACT

Methods, devices and systems for measuring surface roughness and surface shape of an object are described. An example interferometric system includes a collimator and a first and a second light sources with different spectral ranges and different coherence lengths. The system selectively allows light from one of the light sources to reach the collimator, and also includes a beamsplitter, and a Mirau type microscope having an objective lens, a plate with a central reflective spot and a beamsplitter plate to produce a reference beam and a test beam. An imaging lens receives the test and reference beams that form a plurality of interferograms. A neural network receives two of the interferograms for measuring the surface shape and another two interferograms for measuring the surface roughness of the (Continued)

object. The interferometric systems have a compact form, making them suitable for on-machine measurements and other applications.

20 Claims, 15 Drawing Sheets

(51) Int. Cl.

| | | |
|---|---|---|
| *G01B 9/04* | (2006.01) | |
| *G01B 11/24* | (2006.01) | |
| *G01B 11/30* | (2006.01) | |

(52) U.S. Cl.
CPC .......... *G01B 11/2441* (2013.01); *G01B 11/30* (2013.01); *G01B 2290/70* (2013.01)

(58) Field of Classification Search
CPC .... G01B 9/02057; G01B 9/0209; G01B 9/04; G01B 2290/70; G01B 11/2441; G01B 11/30
See application file for complete search history.

(56) References Cited

U.S. PATENT DOCUMENTS

| | | | |
|---|---|---|---|
| 2008/0024788 A1* | 1/2008 | Shimizu ............. | G01B 9/02091 356/497 |
| 2019/0017803 A1 | 1/2019 | Trenholm et al. | |
| 2021/0088321 A1* | 3/2021 | Pau .................... | G01B 9/02007 |

OTHER PUBLICATIONS

A. L. Maas, A. Y. Hannun, and A. Y. Ng, "Rectifier nonlinearities improve neural network acoustic models," in Proceedings of the International Machine Learning Society, 30 (2013).
C. J. Evans, and J. B. Bryan, ""Compensation for Errors Introduced by Nonzero Fringe Densities in Phase-Measuring Interferometers,"" CIRP Annals 42, 577-580 (1993).
D. Kando, S. Tomioka, N. Miyamoto, and R. Ueda, ""Phase Extraction from Single Interferogram Including Closed-Fringe Using Deep Learning,"" Appl. Sci. 9(17), 3529 (2019).
D. Kingma and J. Ba, "Adam: a method for stochastic optimization," in International Conference on Learning Representations (ICLR), (San Diego, 2015).
D. Malacara, M. Servin, and Z. Malacara, Interferogram analysis for optical testing (CRC press, 2005).
D. Malacara, Optical Shop Testing (Wiley, 2007).
G. Dardikman-Yoffe, D. Roitshtain, S. K. Mirsky, N. A. Turko, M. Habaza, and N. T. Shaked, "PhUn-Net: ready-to-use neural network for unwrapping quantitative phase images of biological cells," Biomed. Opt. Express 11, 1107-1121 (2020).
G. Lai, and T. Yatagai, ""Generalized phase-shifting interferometry,"" J. Opt. Soc. Am. A 8, 822-827 (1991).
H. Yiwei, X. Hou, Q. Haiyang, and W. Song, ""Retrace error reconstruction based on point characteristic function,"" Opt. Express 23, 28216-28223 (2015).

J. Deng, K. Wang, D. Wu, X. Lv, C. Li, J. Hao, J. Qin, and W. Chen, ""Advanced principal component analysis method for phase reconstruction,"" Opt. Express 23, 12222-12231 (2015).
J. Vargas, J. A. Quiroga, C. O. S. Sorzano, J. C. Estrada, and J. M. Carazo, ""Two-step demodulation based on the Gram-Schmidt orthonormalization method,"" Opt. Lett. 37, 443-445 (2012).
J. Vargas, J. A. Quiroga, C. O. S. Sorzano, J. C. Estrada, and J. M. Carazo, ""Two-step interferometry by a regularized optical flow algorithm,"" Opt. Lett. 36, 3485-3487 (2011).
K. Wang, Y. Li, Q. Kemao, J. Di, and J. Zhao, ""One-step robust deep learning phase unwrapping,"" Opt. Express 27, 15100-15115 (2019).
K. Yan, Y. Yu, T. Sun, A. Asundi, and Q. Kemao, ""Wrapped phase denoising using convolutional neural networks,"" Optics and Lasers in Engineering 128, 105999 (2020).
L. Huang, C. Rao, and W. Jiang, ""Modified Gaussian influence function of deformable mirror actuators,"" Opt. Express 16, 108-114 (2008).
Li, Ziqiang, et al., "Random two-frame interferometry based on deep learning," Optics Express, vol. 28, No. 17, 2020.
M. Takeda, H. Ina, and S. Kobayashi, ""Fourier-transform method of fringe-pattern analysis for computer-based topography and interferometry,"" J. Opt. Soc. Am. 72, 156-160 (1982).
N. Srivastava, G. Hinton, A. Krizhevsky, I. Sutskever, and R. Salakhutdinov, ""Dropout: a Simple Way to Prevent Neural Networks from Overfitting,"" J. Mach. Learn. Res. 15, 1929-1958 (2014).
O. Ronneberger, P. Fischer, and T. Brox, "U-net: Convolutional networks for biomedical image segmentation," in International Conference on Medical Image Computing and Computer-Assisted Intervention, (Springer, 2015), pp. 234-241.
P. Isola, J.-Y. Zhu, T. Zhou, and A. A. Efros, ""Image-to-image translation with conditional adversarial networks,"" in Proceedings of the IEEE conference on computer vision and pattern recognition (IEEE, 2017), pp. 1125-1134.
S. Ioffe and C. Szegedy, "Batch normalization: Accelerating deep network training by reducing internal covariate shift," arXiv:1502.03167 [cs] (2015).
T. M. Kreis and W. P. O. Juptner, "Fourier transform evaluation of interference patterns: demodulation and sign ambiguity," Proc. SPIE 1553, 263-273 (1992).
T. U. Djork-Arné Clevert, and S. Hochreiter, "Fast and accurate deep network learning by exponential linear units (elus)," arXiv:1511.07289 [cs.LG] (2015).
X. Glorot, A. Bordes, and Y. Bengio, ""Deep sparse rectifier neural networks,"," in Proceedings of the fourteenth international conference on artificial intelligence and statistics (2011), pp. 315-323.
Z. Cheng, and D. Liu, ""Fast and accurate wavefront reconstruction in two-frame phase-shifting interferometry with unknown phase step,"" Opt. Lett. 43, 3033-3036 (2018).
Z. Ge, F. Kobayashi, S. Matsuda, and M. Takeda, ""Coordinate-transform technique for closed-fringe analysis by the Fourier-transform method,"" Appl. Opt. 40, 1649-1657 (2001).
Z. Wang, and B. Han, ""Advanced iterative algorithm for phase extraction of randomly phase-shifted interferograms,"" Opt. Lett. 29, 1671-1673 (2004).
Creath, Katherine, "Phase-Measurement Interfometry Techniques," Progress in Optics, E. Wolf, ed. Elsevier, 1988, vol. 26, 349-393.

* cited by examiner

INTERFEROMETRIC SYSTEM WITH DEEP LEARNING ALGORITHM TO PROCESS TWO INTERFEROGRAMS

CROSS-REFERENCE TO RELATED APPLICATION(S)

This patent document is a 371 National Stage Application of International Patent Application No. PCT/US2022/025005, filed Apr. 15, 2022, which claims priority to the provisional application with Ser. No. 63/175,729 titled, INTERFEROMETRIC SYSTEM WITH DEEP LEARNING ALGORITHM TO PROCESS TWO INTERFERO-GRAMS, filed Apr. 16, 2021. The entire contents of the above noted applications are incorporated by reference as part of the disclosure of this document.

STATEMENT REGARDING FEDERALLY SPONSORED RESEARCH

This invention was made with government support under Grant No. 1918260 awarded by National Science Foundation. The government has certain rights in the invention.

TECHNICAL FIELD

The technology described in this patent document generally relates to optical testing and measurement, and more particularly to devices and methods that use interferometry for measuring characteristics of an object.

BACKGROUND

With increasing needs for high precision optical elements, accurate and efficient fabrication processes are highly demanded, placing ultrahigh requirements on the measurement tools to improve workpiece quality control and to manage machining processes. While various interferometric techniques have been developed to measure surface characteristics, there is still a need to improved measurement accuracy that can be obtained at lower cost and with a reduced complexity of the measurement system.

SUMMARY

The disclosed embodiments, among other features and benefits, enable the measurement of surface roughness and surface shape using interferometric systems and neural network data processing, with a compact form, making them suitable for on-machine measurements among other configurations. Example applications of the disclosed embodiments include metrology, optical testing and measurement.

An example interferometric system can be constructed that includes a collimator positioned to receive light from a first light source having a first wavelength or first range of wavelengths, and from a second light source having light with a smaller coherence length than light from the first light source, and a second wavelength or second range of wavelengths different from the first wavelength or first range of wavelengths. The interferometric system is configured to selectively allow light from one of the light sources to reach the collimator at a given time, and includes a beamsplitter, and a Mirau type microscope configuration including an objective lens, a plate with a central reflective spot and a beamsplitter plate to produce a reference beam and a test beam for illuminating the object. The interferometric system additionally includes an imaging lens positioned to receive the test beam and the reference beam; light from the test and reference beams upon reaching an image plane of the imaging lens form a plurality of interferograms at the image plane. The interferometric system further includes an image processing unit that includes a processor and a memory with instructions stored thereon. The instructions upon execution by the processor cause the processor to use an artificial neural network configured to receive two of the plurality of interferograms associated with the first light source to enable a measurement of a surface shape of the object and to receive another two of the plurality of interferograms associated with the second light source to enable a measurement of a surface roughness of the object.

DETAILED DESCRIPTION

Figure 1:
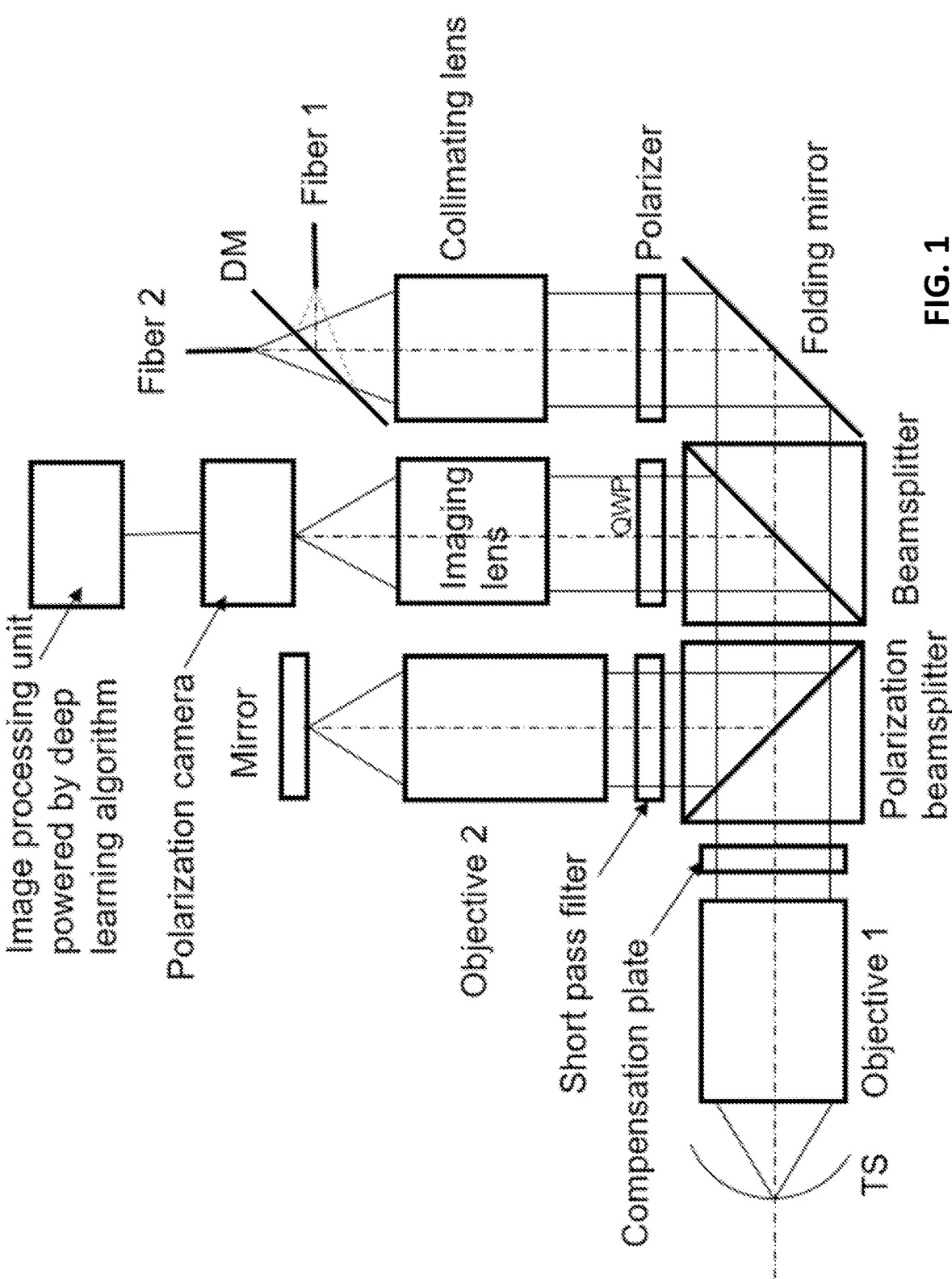
FIG. 1 illustrates a diagram of a snapshot dual-mode interferometric system in accordance with an example embodiment.

With increasing needs for high precision optical elements, accurate and efficient fabrication processes are highly demanded, placing ultrahigh requirement on the measurement tools to improve workpiece quality control and to manage machining processes. As a recognized accurate testing method, interferometry has been a powerful method for non-contact surface metrology of optical elements. Various laser interferometers, such as Fizeau interferometer, Twyman-Green interferometer, and point-diffraction interferometer, have been developed for surface form metrology, which is the low spatial frequency form error. Surface roughness can be measured by the low coherence interference microscopes with either white light sources or light emitting diodes (LEDs). With the combination of laser interferometer and interference microscope, the surface characteristics of workpieces over a wide range of spatial frequencies can be accurately evaluated. Most of the commercially available interferometers, such as those from Zygo and 4D Technology, are designed in a single working mode, either in the interferometer mode or the interference microscope mode. Thus, multiple measuring instruments are required to achieve the comprehensive evaluation of optical surface. Due to the limited space in the fabrication machine and accessibility of workpiece surface, the instrument for on-machine metrology should be compact. However, most of these commercial instruments are designed for off-line application, they are large in volume, and are thus not suitable for on-machine metrology. In particular, the workpiece has to be removed from the machine for off-line metrology and then re-positioned back to the machine for further processing if the quality doesn't meet the specifications. This process is very time consuming, adding to the cost and introducing additional fabrication errors.

Various on-machine and in-process measurement methods and systems have also been developed for ultra-precision machining systems that use interferometers, adaptive-optics-assisted system based on light scattering, chromatic confocal probes, stereo vision techniques, and fringe deflectometry. However, these techniques can only measure either surface shape or surface roughness.

As one of the most popular techniques in optical metrology, traditional Phase-shifting interferometry (PSI) requires three or more interferograms with fixed, known phase steps. However, the acquisition of these interferograms is time-consuming and sensitive to mechanical vibrations, ambient air turbulence and temperature changes. Thus, the number of interferograms should be reduced to minimize the recording time. But it is difficult to reconstruct the phase with only one interferogram because, for example one interferogram cannot distinguish between positive or negative values of defocus, and it is difficult to separate convex surfaces from concave surfaces from one interferogram. If there is no additional prior information, at least two frames of interferograms are needed to solve the sign ambiguity problem. Some prior systems based on a Fourier-transform method to extract the phase from a single interferogram introduce a large spatial-carrier frequency such that the phase information can be separated from unwanted irradiance variations in Fourier domain. However, the limitation is that an interferogram with closed-fringes cannot be applied. Thus, a large tilt is needed to generate the wanted spatial carrier, which will make the fringes denser. If the fringes are too dense, not only the camera cannot record them, but also it will cause considerable retrace error. To simplify the measurement process and reduce the instrument cost, the phase reconstruction using two frames of interferograms has been investigated extensively in the past decade. A demodulation method, called Kreis method, based on the Fourier transform of two interferograms was proposed. This method can demodulate the phase from two interferograms without sign ambiguity, but it is very sensitive to noise.

A two-step interferometric method based on a regularized optical flow (OF) algorithm has also been proposed. This method does not need to normalize the fringe pattern but needs to subtract the direct-current (DC) term. A phase reconstruction method based on Gram Schmidt (GS) orthogonalization with two fringe patterns as independent vectors has been proposed, as well. While this method is widely used in two-frame interferometry, the techniques described herein that utilize two-frame interferometry have higher accuracy and enable the determinations of surface shape and surface roughness with lower RMS errors.

FIG. 1 illustrates a diagram of a snapshot dual-mode interferometric system in accordance with an example embodiment. Two light sources (not shown) are used in the system: a laser (e.g., with a wavelength 632.8 nm) for surface shape measurement and an LED (e.g., with a central wavelength 540 nm) for surface roughness measurement. In the example configuration of FIG. 1, light from each of the light sources is coupled into an optical fiber such as Fiber 1 and Fiber 2 (e.g., a single-mode optical fiber for laser and a multimode fiber for the LED) via a dichroic mirror (DM) and collimated by a collimating lens. The light then goes through a polarizer (e.g., a wire grid linear polarizer (WGP)) with its transmission axis oriented at a particular angle, such as 45° to x-axis. By rotating the transmission axis of the polarizer, the relative intensity of the light in the test and reference arms can be adjusted to obtain the optimal fringe contrast.

In the example configuration of FIG. 1, the collimated linearly polarized light, after reflection from a folding mirror, passes through a beamsplitter (BS) to a polarizing beamsplitter (PBS). The p- and s-polarized beams are transmitted and reflected from the PBS, respectively, serving as test and reference beams. To achieve the different working modes with a single system configuration, a short pass filter (e.g., a high-performance short pass optical filter, such as #84-710, Edmund Optics Inc., with rejection (reflection) wavelength range 614-900 nm and transmission wavelength range 350-587 nm) is placed in the reference arm between the PBS and the second objective lens (Objective 2) to reflect the laser beam and transmit the LED light for two different measurement modes. A compensation plate (e.g., a longpass filter, such as #62-983, Edmund Optics Inc., with rejection wavelength range 200-490 nm and transmission wavelength range 508-1650 nm) is positioned between the first objective lens (Objective 1) and the PBS in the test arm. The compensation plate is selected to match the optical path length in the test and reference arms for the low-coherence mode of operation.

To switch between the working modes, one of the optical fibers with the corresponding light source can be connected to the source interface, e.g., the collimating lens, while the other fiber and/or associated laser is disconnected or turned off, making the system extremely convenient for practical on-machine metrology applications. FIG. 1 illustrates one example configuration for delivering light from the two light sources (e.g., received through Fiber 1 and Fiber 2) to the collimator. In this configuration, with the long working distance custom collimator (e.g., an off axis parabolic mirror with a working distance of greater than 10 mm), a dichroic mirror (DM) can be used to deliver both the laser light and the LED light to the collimator so that it is not necessary to switch the fibers. Therefore, two different measurement modes can be implemented by simply turning ON/OFF (or otherwise blocking or disabling) the laser or the LED.

In the laser interferometer mode, the reference laser beam serves as the light source, enabling measurements of the surface form and associated parameters, such as the radius of curvature. In the interference microscope mode, the LED serves as the light source, enabling surface roughness measurements.

In the laser interferometer mode, laser light from Fiber 1 is delivered to the collimator after reflection from the dichroic mirror (DM). Light that is output from the collimating lens passes through the polarizer (e.g., a WPG) is linearly polarized, is reflected by the folding mirror, passes through the beamsplitter (BS), and enters the polarization beamsplitter (PBS). The PBS splits the light, such that light having a particular polarization is reflected by the PBS and is directed to the short pass filter (this path forms part of the reference path); light having another type of polarization passes through the PBS (this path forms part of the test path). The reference laser beam is reflected by the short pass filter, and is then reflected by the PBS towards the BS. The test beam passes through the compensation plate and is focused on test surface (TS) of the sample by the long working distance first objective lens (Objective 1) (e.g., Mitutoyo Plan Apo 10× and NA 0.28). Objective 1 transforms the light to a spherical wave to match the test surface (TS). In some embodiments, by removing the Objective 1, the system can be used for testing flat surfaces. The test beam, upon reflection from TS, passes through Objective 1, the compensation plate and PBS toward the BS. Both the test and reference beams that enter the BS are reflected by the BS and pass through a quarter wave plate (QWP), which transforms the orthogonally linearly polarized test and reference beams to oppositely circularly polarized beams.

The light that passes through the QWP is received by an imaging lens that images the interference fringes (or interferograms) onto a polarization camera (PCam). In one example that is suited for on-machine measurement, a pixelated polarization monochrome camera from FLIR Systems Inc. can be used to capture the phase-shifted interferograms in a single shot. In the example system, a Sony polarization image sensor (SONY IMX250MZR, resolution: 2448×2048 pixels, pixel size: 3.45 µm) inside the polarization camera has a built-in micro-polarizer array with four linear polarizers at 0°, 45°, 90° and 135° adjacent to each other, forming a 2×2 superpixel. This polarization camera enables a snapshot capture of four interferograms with motionless phase shifting, thus allowing the system to make real time on-machine measurements that is insensitive to environmental disturbances.

In the interference microscope mode, light from the second source (e.g., an LED) is delivered via Fiber 2, passes through the DM to reach the collimator. The light then passes through the polarizer (e.g., a WGP), is reflected by the folding mirror, and passes through beamsplitter, similar to the first mode of operation described above. The test light passes through the polarization beamsplitter, through the compensation plate, through Objective 1, which focuses the test light on TS. The reflected test light travels back through Objective 1, through the compensation plate, and through polarization beamsplitter toward the beamsplitter. The reference light is reflected by the PBS, passes through the short pass filter and is focused on the reference optical element (e.g., reference mirror (RM)) by a matching Objective 2 (Mitutoyo Plan Apo 10× and NA 0.28). After reflection from RM, the reference light passes back through Objective 2 and short pass filter, and is reflected by the PBS towards the BS. The reference and test beams are reflected by the BS, pass through the QWP and are focused at the image plane of the collimating lens onto the polarization camera. The PCam then captures the interferences fringes as described in connection with the first mode of operation. Two of the four interferograms obtained at the PCAM are processed by the deep learning algorithm discussed below.

Figure 2:
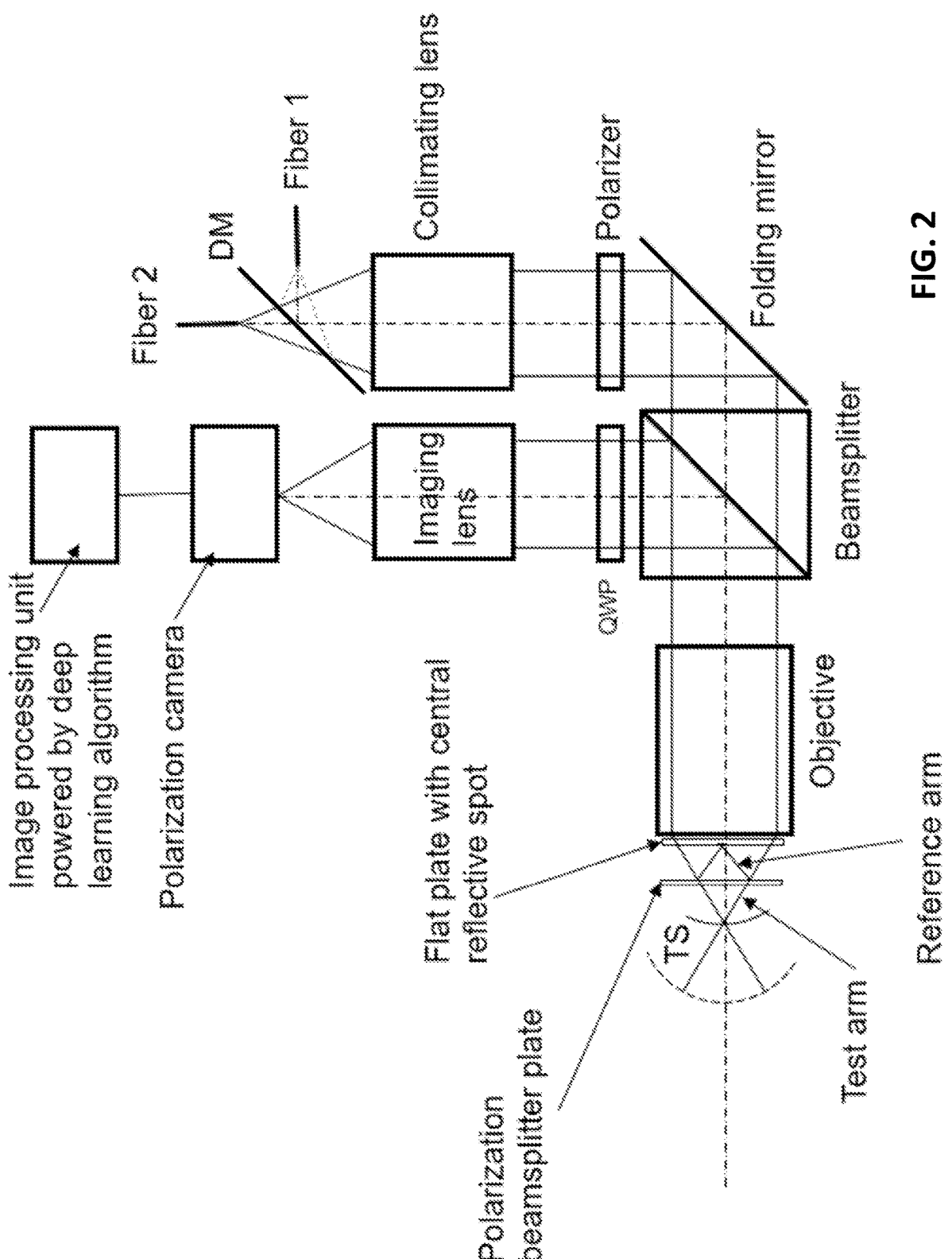
FIG. 2 illustrates another snapshot dual-mode interferometric system that uses a Mirau type microscope objective in accordance with an example embodiment.

FIG. 2 illustrates an example embodiment with a Mirau type microscope objective, which includes a polarization beamsplitter and a flat plate with central reflective spot. The polarization beamsplitter separates the light from the light source to be directed to the test and reference arms. The reference beam reflected from the reflective spot in the flat plate and the test beam reflected from the test surface are directed to the polarization camera similar to the configuration in FIG. 1.

The embodiments in FIGS. 1 and 2 can simultaneously capture four phase-shifted interferograms. These configurations are particularly suitable for on-machine metrology. One limitation is that these configurations are relatively expensive because they include an expensive polarization camera and additional polarization components (polarization beamsplitter, quarter wave plate, and polarizer) and therefore may not be suitable for low cost implementations.

Figure 3:
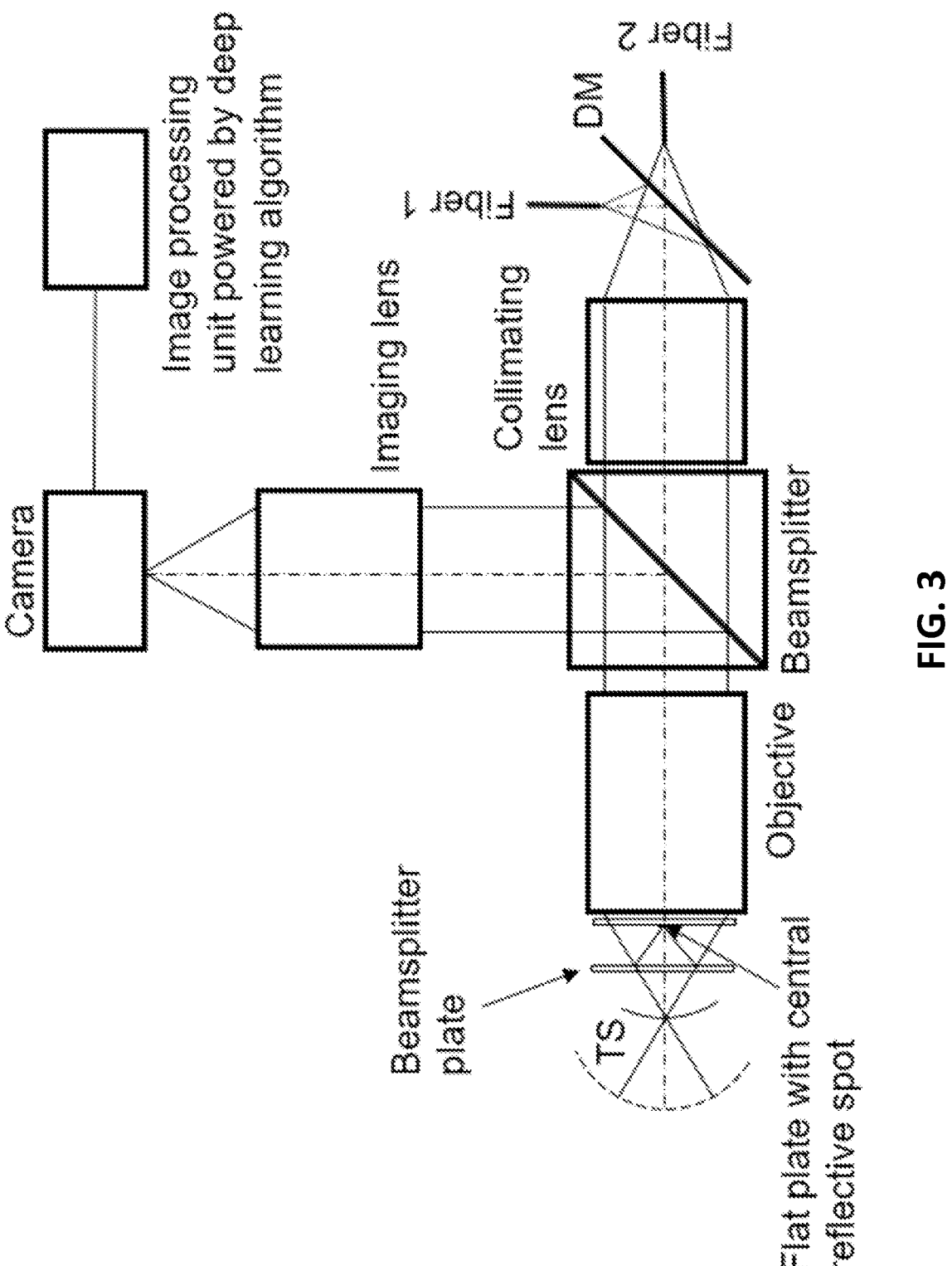
FIG. 3 illustrates another snapshot dual-mode interferometric system that uses a Mirau type microscope objective and a regular camera that is not polarization sensitive in accordance with an example embodiment.

The interferometric system can be simplified to reduce the cost by using a deep learning processing that only requires two interferograms with unknown phase shifts. FIG. 3 illustrates an example embodiment. In this configuration, a regular low-cost camera can be used. Light from the two light sources is provided to the interferometric system using Fiber 1 and Fiber 2, and a dichroic mirror followed by a collimating lens, as previously described. The Mirau type microscope objective in this embodiment includes a beamsplitter (illustrated as a beamsplitter plate between the objective and the TS) to separate the light from the light source and to direct the light to the test arm and the reference arm. The configuration also includes a flat plate with a central reflective spot to reflect the reference beam back to the objective. Two interferograms can be captured sequentially by slightly shifting the relative axial position between the interferometric system and the test surface. Since it is not necessary to know the phase shift between two interferograms, there are a number of approaches to shift the relative axial position between the interferometric system and the test surface, including a low-cost computer-controlled mechanical stage, a voice coil actuator, or a piezo plate or tube. We can also use the machining stage, for example, the slow slide server in a diamond turning machine. The remaining components (other than the camera) depicted in FIG. 3 can be similar to those described in connection with FIGS. 1 and 2.

Figure 4A:
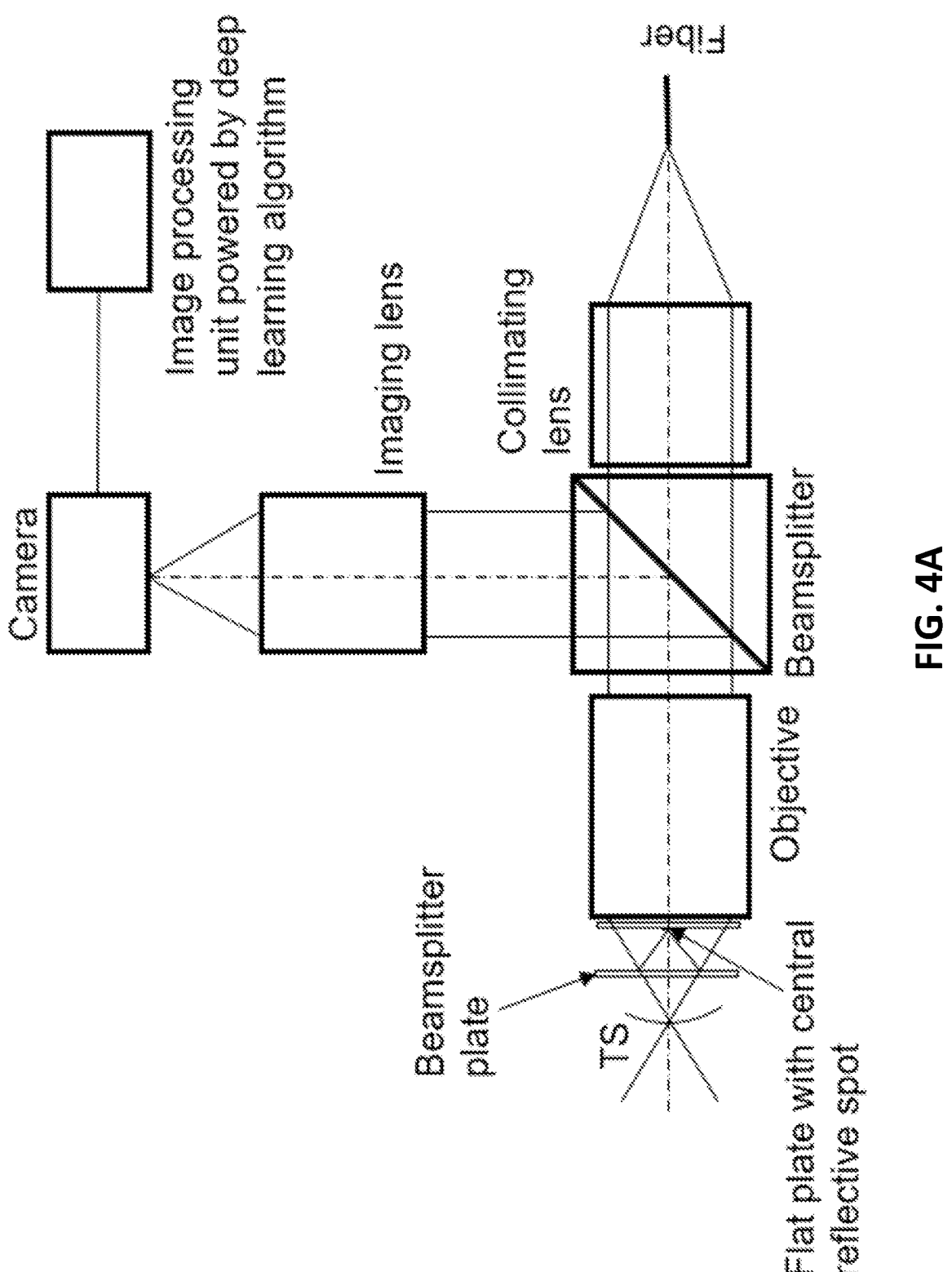
FIG. 4A illustrates a configuration of an interferometric system that utilizes a regular objective lens with a light source to produce interferograms for measuring surface roughness in accordance with an example embodiment.

FIG. 4A illustrates an example embodiment that includes a regular objective that utilizes an LED light source to produce interferograms for measuring surface roughness of the test sample (TS). The light beam output from the collimating lens is separated by the beamsplitter plate in the Mirau objective to produce light for the test arm and the reference arm. The test beam illuminates the sample via the objective, and the reflected light from the test surface and the reference beam reflected from the flat plate with central reflective spot are directed to the camera. As with other configurations, the test sample is positioned with respect to the objective such that rays are incident at normal angles on the test surface. For illustration purposes, and not by limitation, a concave test surface is depicted, but other types of surfaces, such as a convex test surface, can be readily positioned in the configuration while satisfying the normal incidence condition.

Figure 4B:
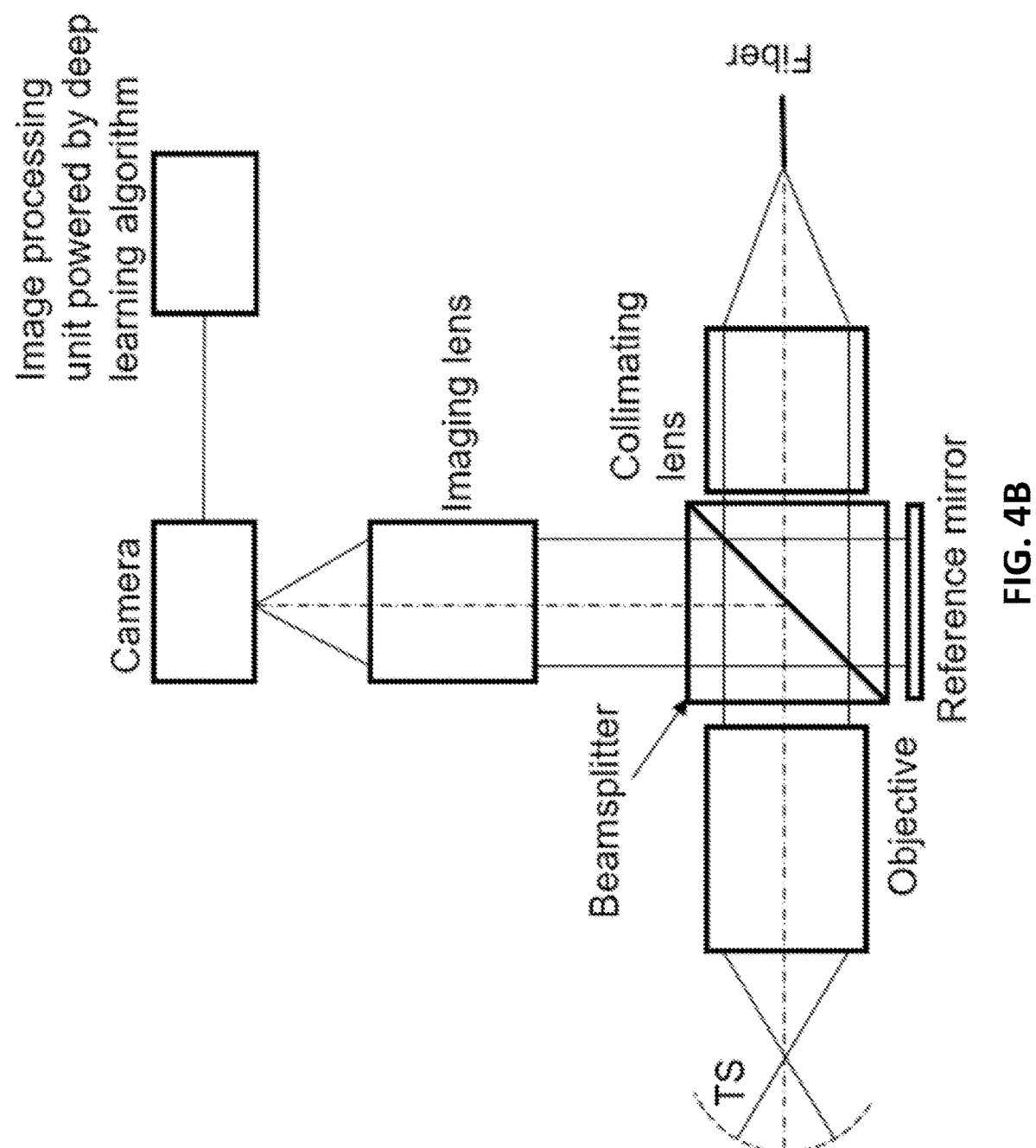
FIG. 4B illustrates another configuration of an interferometric system that includes a regular objective that is suitable for the laser interferometer mode for measuring surface shape in accordance with an example embodiment.

FIG. 4B illustrates another example embodiment that includes a regular objective that is suitable for the laser interferometer mode for measuring surface shape. The collimated laser beam is separated into test arm and reference arm by the beamsplitter. The test beam reflected from the test surface and the reference beam reflected from the reference mirror will be directed to the camera. While the configurations of FIGS. 4A and 4B enable the measurements of surface roughness and surface shape, they may not produce the optimum accuracy because of the differing optical path lengths associated with the test and reference beams.

Figure 5:
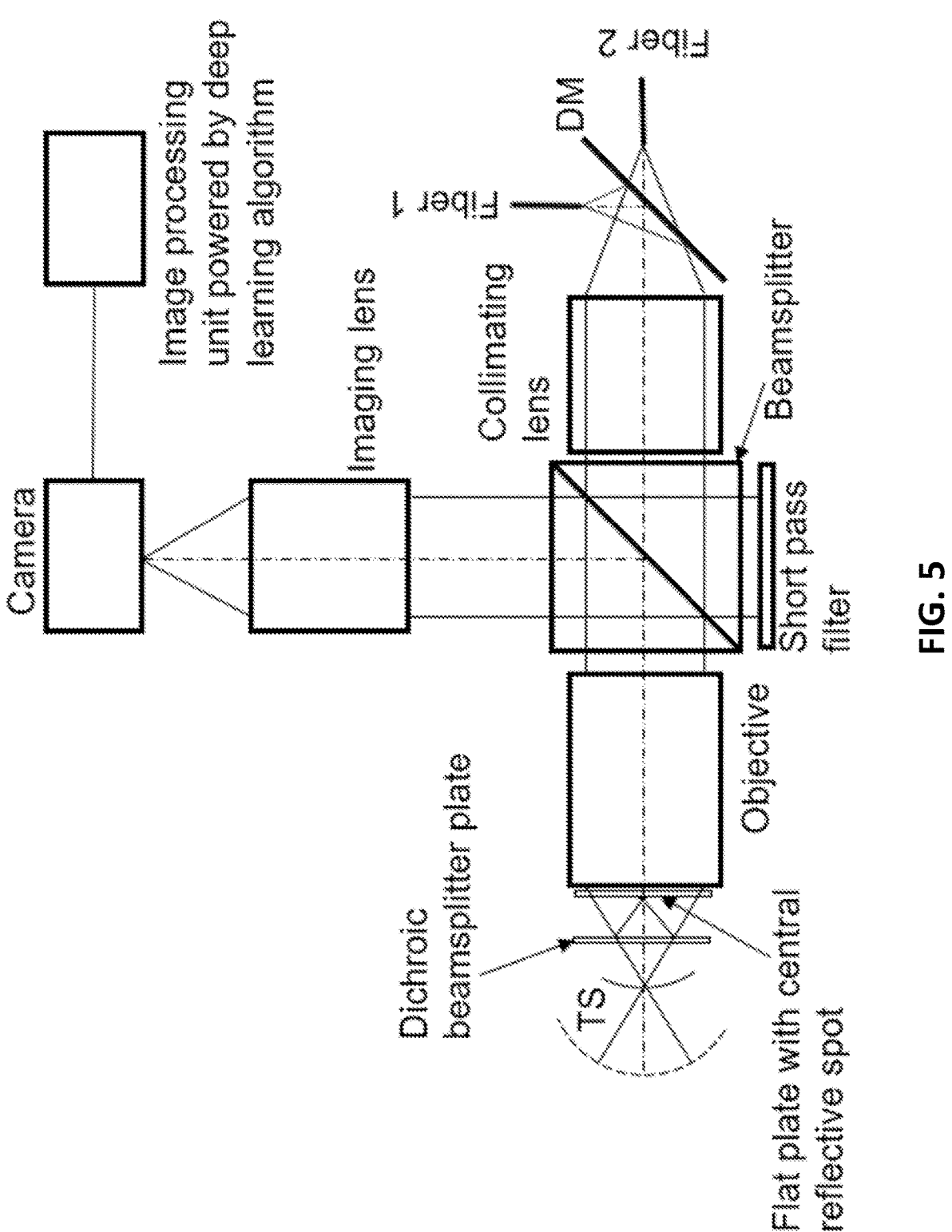
FIG. 5 illustrates another configuration of a snapshot dual-mode interferometric system in accordance with an example embodiment.

FIG. 5 illustrates another example configuration in accordance with some embodiments. The illustrated configuration is a dual-mode interferometric system with a special Mirau objective. The configuration of FIG. 5 has similar components as in FIG. 3 but instead of using a polarization beam splitter or a regular beam splitter plate, a long pass dichroic beamsplitter (for example, a beamsplitter that reflects the light with wavelength shorter than 600 nm and transmits the wavelength longer than 620 nm) is used so that the system can work in dual-mode. In the laser interferometer mode, the collimated laser beam is separated for the test and reference arms by the beamsplitter. The reference beam is reflected from the short pass filter which is used as a reference mirror. The test beam passes through the long pass dichroic beamsplitter and reaches the test surface. The reflected test beam and the reference beam are directed to the camera. In the interference microscope mode, the collimated light from LED is first separated to two paths by the beamsplitter. The portion of light that is reflected by the beamsplitter passes through the short pass filter and is absorbed by an absorber or light trapper (not shown). The portion of light that is transmitted through the beamsplitter passes through the objective and is then separated by the dichroic beamsplitter plate to the test beam and reference beam. The reflected test beam and reference between are then directed to the camera.

In traditional four-step Phase shifted interferometry (PSI), the four phase-shifted interferograms can be described as:

$$I_1(x, y) = a(x, y) + b(x, y)\cos[W(x, y)], \qquad (1)$$

$$I_2(x, y) = a(x, y) + b(x, y)\cos\left[W(x, y) + \frac{1}{2}\pi\right], \qquad (2)$$

$$I_3(x, y) = a(x, y) + b(x, y)\cos[W(x, y) + \pi], \qquad (3)$$

$$I_4(x, y) = a(x, y) + b(x, y)\cos\left[W(x, y) + \frac{3}{2}\pi\right]. \qquad (4)$$

In the above equations, $I_1$, $I_2$, $I_3$, and $I_4$ are the intensities of the four interferograms respectively, a represents the DC term, b represents the modulation term and W is the original phase, and (x,y) are the coordinates.

We can filter out the unwanted background intensities a and b by using the equation below:

$$\phi = \arctan\left(\frac{I_4 - I_2}{I_1 - I_3}\right). \qquad (5)$$

In the above equation, $\phi$ is the wrapped phase of the original phase W.

The traditional four-step PSI requires four interferograms with accurate phase steps of $\pi/2$. This method is sensitive to mechanical vibrations, ambient air turbulence and temperature changes. Thus, many advanced algorithms have been proposed to reduce the number of interferograms.

In a prior Fourier-transform method, when the tilt is not set to zero, the fringe pattern can be expressed as:

$$I(x, y) = a(x, y) + b(x, y)\cos[2\pi f_0 x + W(x, y)]. \qquad (6)$$

In the above equation, $f_0$ is called the spatial-carrier frequency introduced by the tilt. In most cases, a, b and W vary slowly compared with $f_0$.

An image-sensing device (such as CCD and CMOS) that has enough resolution to satisfy the sampling-theory requirement is used to capture the fringes. The fringe pattern is rewritten in the following form for convenience of explanation:

$$I(x, y) = a(x, y) + c(x, y)\exp(2\pi i f_0 x) + c * (x, y)\exp(-2\pi i f_0 x), \qquad (7)$$

In Eq. (7), * denotes a complex conjugate, and c(x,y) is:

$$c(x, y) = \frac{1}{2}b(x, y)\exp[iW(x, y)]. \qquad (8)$$

Then the fast-Fourier-transform (FFT) algorithm is used to transform Eq. (7) into Fourier domain as follows:

$$FI(fx, fy) = A(fx, fy) + C(fx - f_0, fy) + C * (fx + f_0, fy). \qquad (9)$$

In Eq. (9), FI represents the Fourier spectra of intensity I, and the other capital letters denote the corresponding Fourier spectra in Eq. (7). (fx, fy) are the spatial frequency in the x direction and y directions, respectively. Since the spatial variations of a, b and W are slow compared with the spatial frequency $f_0$, the Fourier spectra in Eq. (9) are separated by the carrier frequency $f_0$. Thus, C(fx−$f_0$, fy) can be extracted and to obtain C(fx,fy). Note that the unwanted background variation a has been filtered out in this stage.

Again, using the FFT algorithm, we compute the inverse Fourier transform of C(fx,fy) with respect to (fx,fy) and obtain c(x,y), defined by Eq. (8). Then we calculate a complex logarithm of Eq. (8):

$$\log[c(x, y)] = \log\left[\frac{1}{2}b(x, y)\right] + i\phi(x, y). \qquad (10)$$

Now we have the wrapped phase $\phi(x,y)$ in the imaginary part completely separated from the unwanted amplitude variation b(x,y) in the real part. However, if the spatial-carrier frequency is not large enough, this method becomes invalid. Besides, this kind of cross-talk in Fourier domain corresponds to closed-fringes in spatial domain. In other words, there is a limitation of the Fourier-transform method, that an interferogram including closed-fringes cannot be applied.

Figure 6:
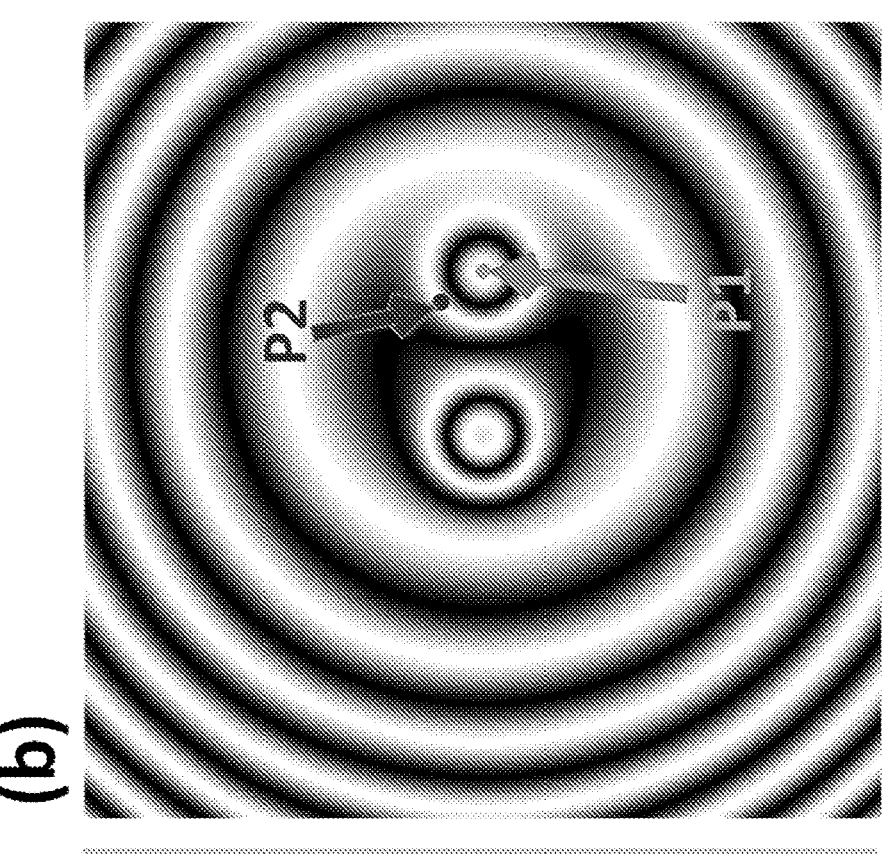
FIG. 6 illustrates an example surface map with two defects and the associated interferogram.
Figure 6:
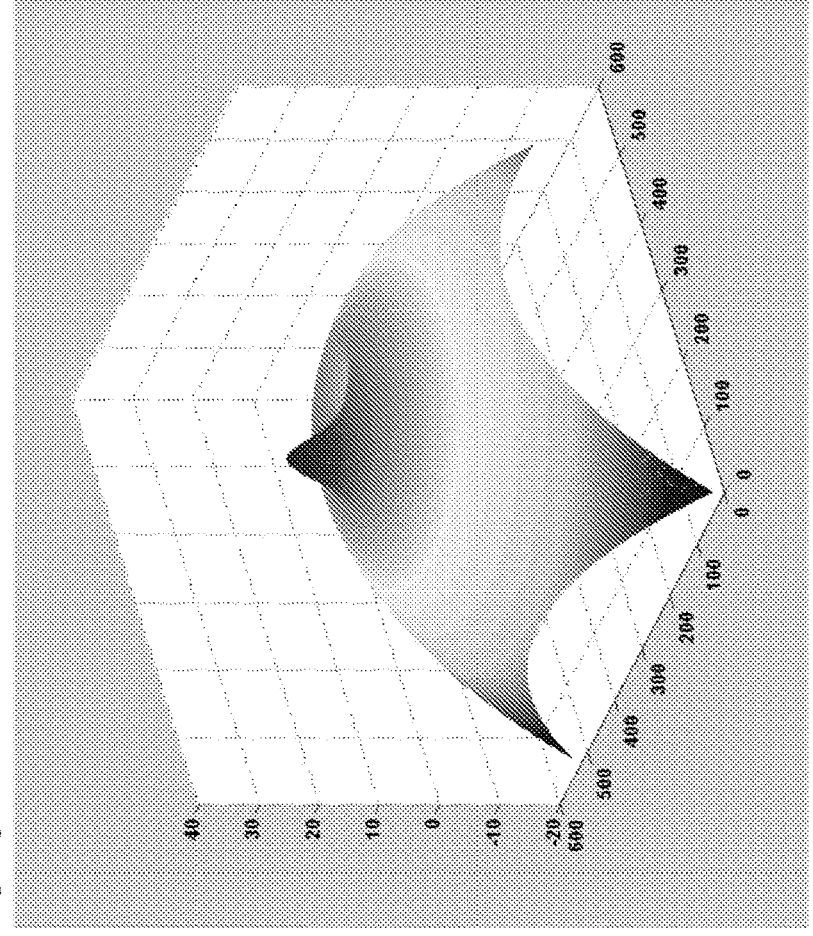
Figure 7:
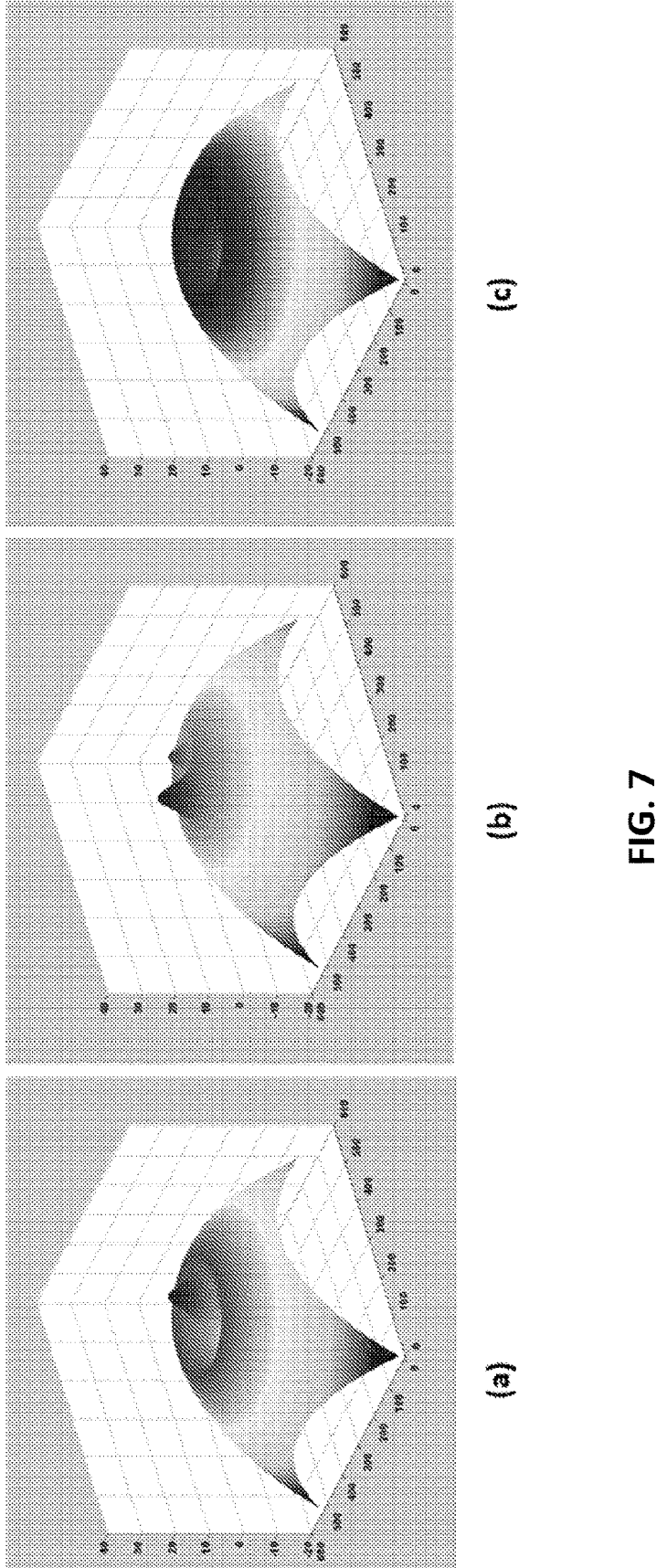
FIG. 7 illustrates alternative surface maps associated a surface with two defects.

Each closed-fringe pattern in interferograms corresponds to two possible situations: a concave surface or a convex surface. This is a typical one-to-multiple mapping relationship. In fact, a one-to-one mapping relationship can be determined by appointing all closed-fringe patterns to be concave surfaces (or convex surfaces). Based on this assumption, a deep learning-based method or an improved Fourier-transform method is implemented to extract phases from single-shot interferograms with closed-fringe patterns. However, freeform surfaces can be considered to be composed of many convex surfaces and concave surfaces, and thus we can never really know whether they are convex or concave in only one interferogram. For example, panel (a) in FIG. 6 shows a sphere with two small defects in the center: one of them can be seen as a small convex surface while the other one can be seen as a small concave surface. A tilt has been added to the sphere but is not large enough to turn closed-fringes in the interferogram into open-fringes. Panel B in FIG. 6 is the interferogram of that sphere. There are two points P1 and P2 on the adjacent fringes as shown in panel (b) of FIG. 6. It is known that the phase difference between P1 and P2 is $2\pi$, but we cannot know which point is higher; similar ambiguity exists for the other defect. Thus, there are four possibilities for the two small defects associated with the same interferogram in panel (b): one that is shown in panel (a) and the other three possible situations are shown in FIG. 7. In particular, in panel (a) in FIG. 7 the convex defect of FIG. 6 is replaced by a concave defect, and the concave defect with a convex one. Panel (b) in FIG. 7 shows two convex defects, and panel (c) shows two concave defects.

Figure 8:
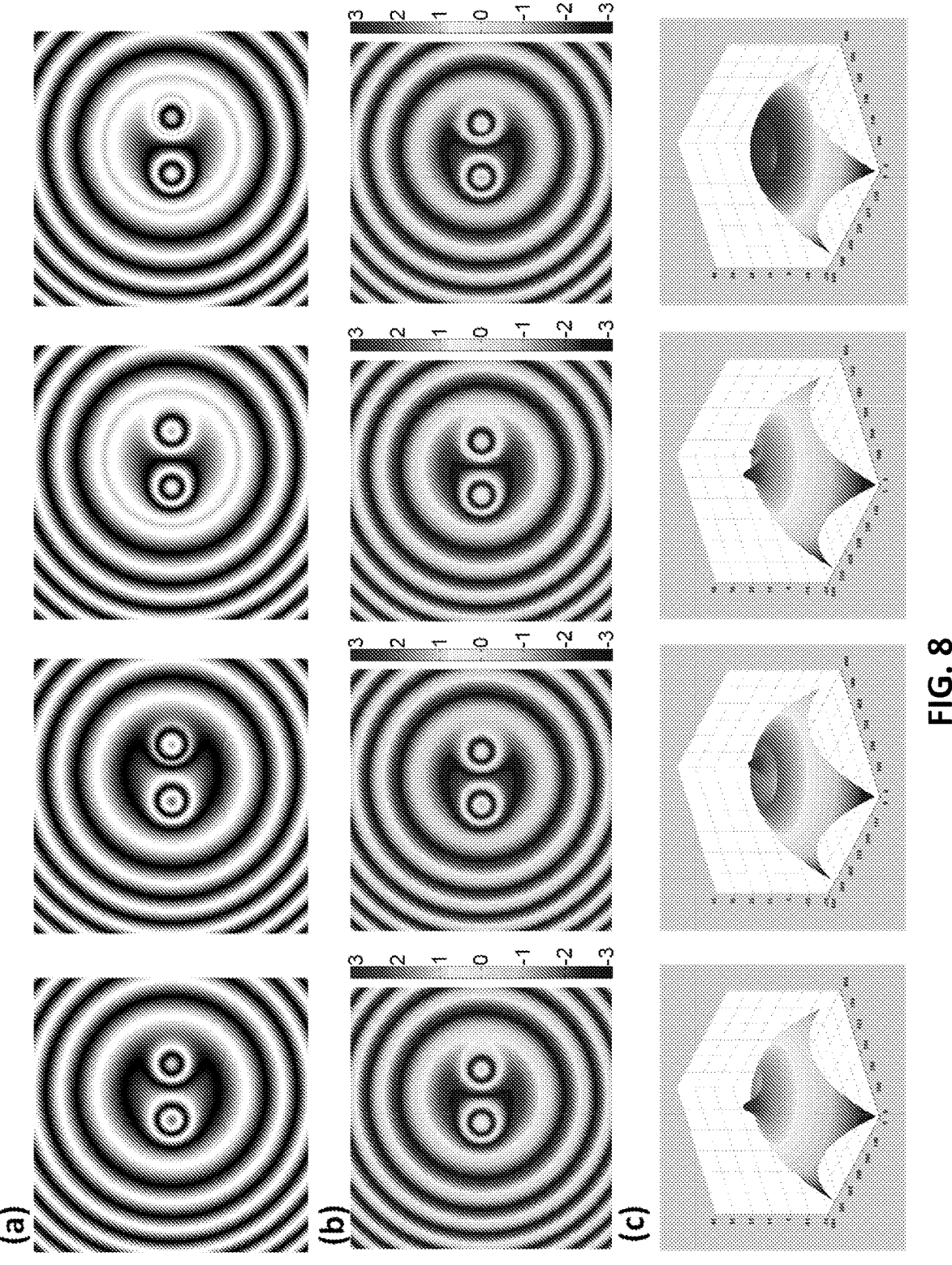
FIG. 8 illustrates interferograms associated with surface defects of FIGS. 6 and 7, associated wrapped phases determined using to interferograms, associated unwrapped phases to reconstruct the surface maps in accordance with example embodiments.

Two-frame methods do not have the sign ambiguity problem. FIG. 8 in panel (a) shows the second set of interferograms for the four surface shapes in panel (a) of FIG. 6 and FIG. 7. Those interferograms are different so that the four situations above can be well distinguished, when combined with the first interferogram in panel (b) of FIG. 6.

Panel (b) in FIG. 8 shows the wrapped phases calculated by the Phase U-Net (PUN) disclosed herein and panel (c) in FIG. 8 shows the reconstructed surface maps using the unwrapped phases that are produced based on panel (b) of FIG. 8. As evident from these figures, the PUN can reconstruct the four different surfaces correctly.

Whether the Fourier-transform method or the deep learning-based one-frame method, in order to fully solve the sign ambiguity problem, all kinds of one-frame interferometry methods need a large tilt which may cause too dense fringe patterns and the retrace error, while two-frame methods do not need such tilts and are more suitable for high precision optical metrology. We proposed a Phase U-Net (PUN) which neither needs a spatial carrier, nor a filter for subtracting the DC term, but only a simple normalization. It can accurately recover the wrapped phase from two interferograms with unknown phase step excluding the singular case, which corresponds to integral multiples of IT.

Figure 9:
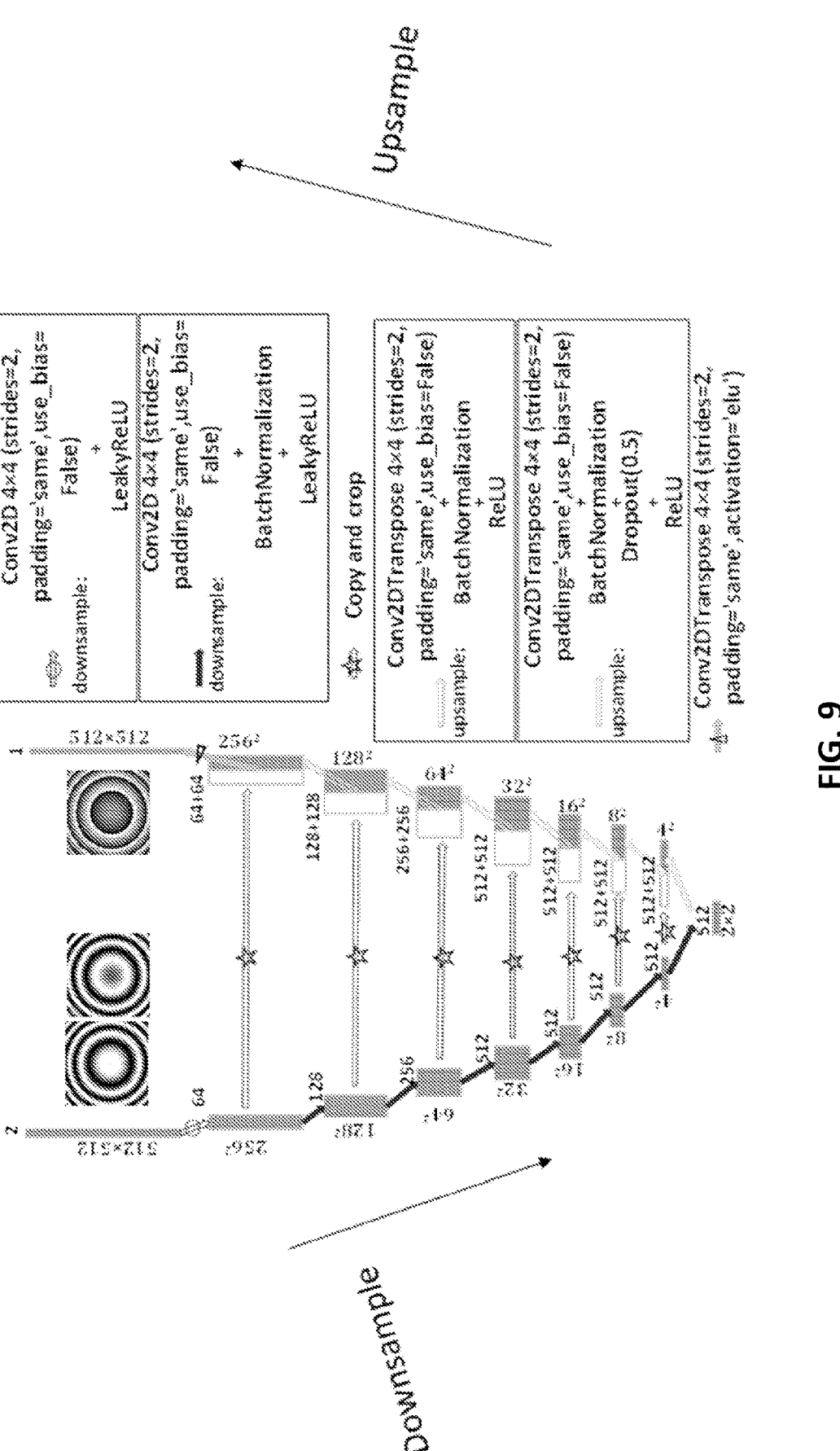
FIG. 9 illustrates an example Phase U-Net (PUN) architecture that can be used in to process interferograms generated in accordance with example embodiments.

An example architecture of the PUN is illustrated in FIG. 9. Different from the U-Net, PUN has no pooling layer because details are important while pooling layers may lose those features. In the PUN shown in FIG. 9, the shaded boxes are multi-channel feature maps. The number of channels is on the top of the box and the other number is the x-y-size. The unshaded boxes represent copied feature maps. We used LeakyReLu activation functions in downsampling steps and ReLU in upsampling steps. Also, Batch Normalization was used in some layers to accelerate training. The Dropout technique was also used in some upsampling steps in order to avoid over-fitting. Different from the U-Net using softmax in the output layer to solve the image segmentation problem as a classification problem, we used the ELU activation function in the output layer to make predictions of the pixel values. It has little impact that the outputs of the ELU activation function do not range from 0 to 1, because all negative outputs can be easily replaced by zeros and values larger than one can also be replaced by ones in post-processing. We have found the mean absolute error loss function as a suitable loss function candidate:

$$loss = \frac{1}{NM} \sum_{i=1}^{N} \sum_{j=1}^{M} (|\phi_{ij} - \chi_{ij}|). \tag{11}$$

In Eq. (11), $\phi_{ij}$ is the (i,j)th value on real wrapped phase $\phi$, $X_{ij}$ is the corresponding value on the predicted wrapped phase, M and N are the image size.

It is significant to note that there is no fully-connected layer in the example network architecture described earlier so that we can not only predict wrapped phases using inputs with the size of 512×512, but also lager images such as 768×768, 1024×1024, and 1280×1280. However, it doesn't mean that there is no limit in the input size for this configuration and the input size must be integral multiples of 256×256. For example, the size of 32×32 is not acceptable in the example configuration of FIG. 9. Because the architecture of the PUN includes two parts: the downsampling part and the upsampling part, in the downsampling part, the image size will be halved from the previous layer of the network to the next layer of the network. The data cannot even reach the bottom layer of the downsampling part when the input size is 32×32. Most artificial neural networks (ANNs) do not allow users to change the input size for two reasons. One reason is that most of ANNs have fully-connected layers in their network architectures. Changing the input size will lead to the change of the number of parameters in the fully-connected layers. But the number of parameters cannot be changed in a concrete network. Thus, the input sizes of ANNs with fully-connected layers just cannot be changed. The other reason is that the test set (or we can call it the real problem) should be independent and identically distributed (i.i.d.) with the training set. Although in the PUN, there is no fully connected layer and thus it allows users to change the input size, the receptive field of the network is limited by the convolution layers. In the same convolution kernel and with the same original phase, the fringe pattern of a large size interferogram is sparser than the fringe pattern of a small size interferogram. That means, the input size cannot be enlarged without limit because that may break the i.i.d. rule. In one word, this network architecture allows users to choose the input size freely within a certain range. For example, the well-trained PUN in this patent document prefers the input sizes between 512×512 to 1280× 1280, and we have tested that the performances fluctuate little in that range.

Figure 10:
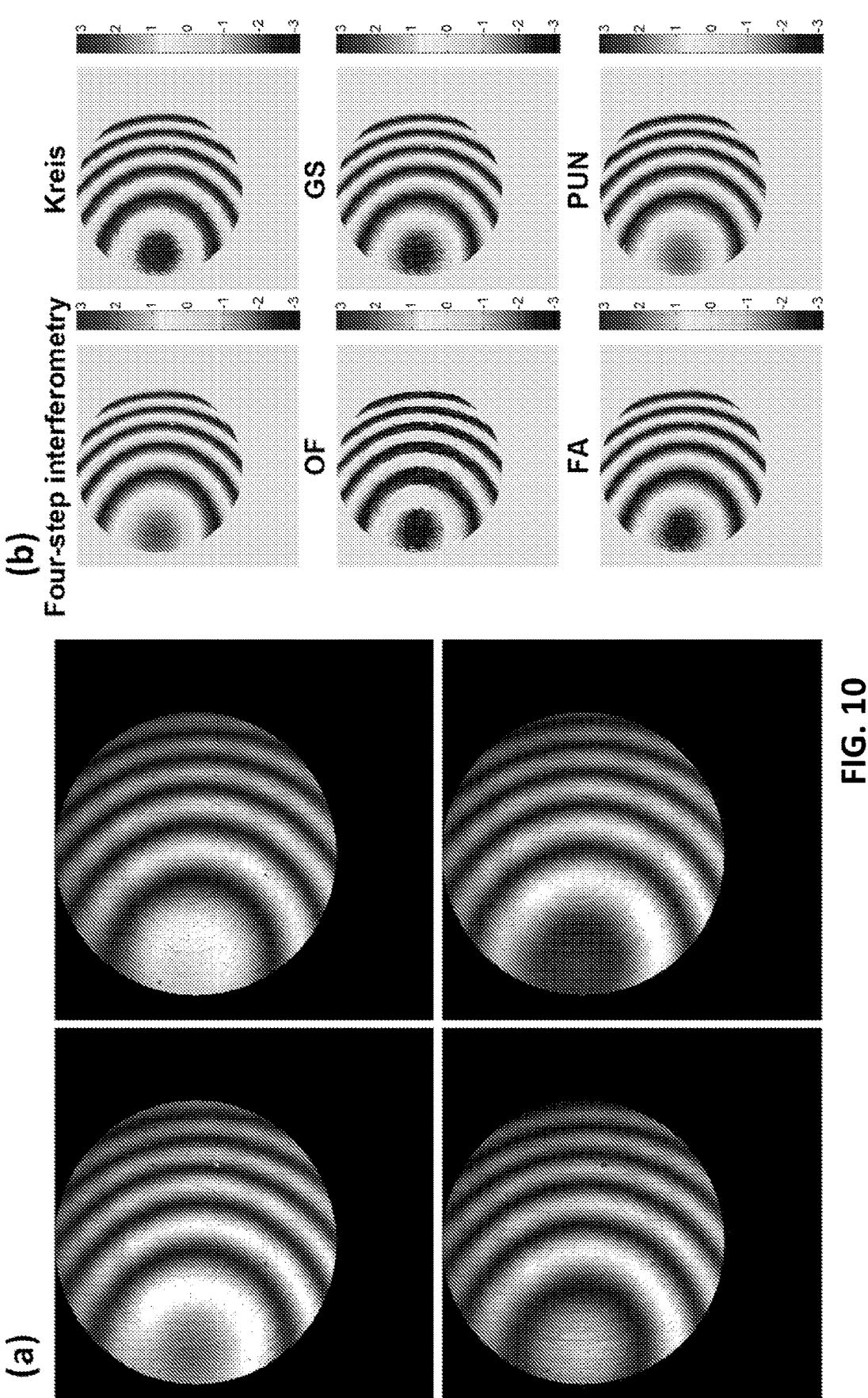
FIG. 10 illustrates a set of example interferograms with $\pi/2$ phase shift in panel (a) and associated wrapped phases determined according to different interferometric techniques in panel (b).
Figure 11:
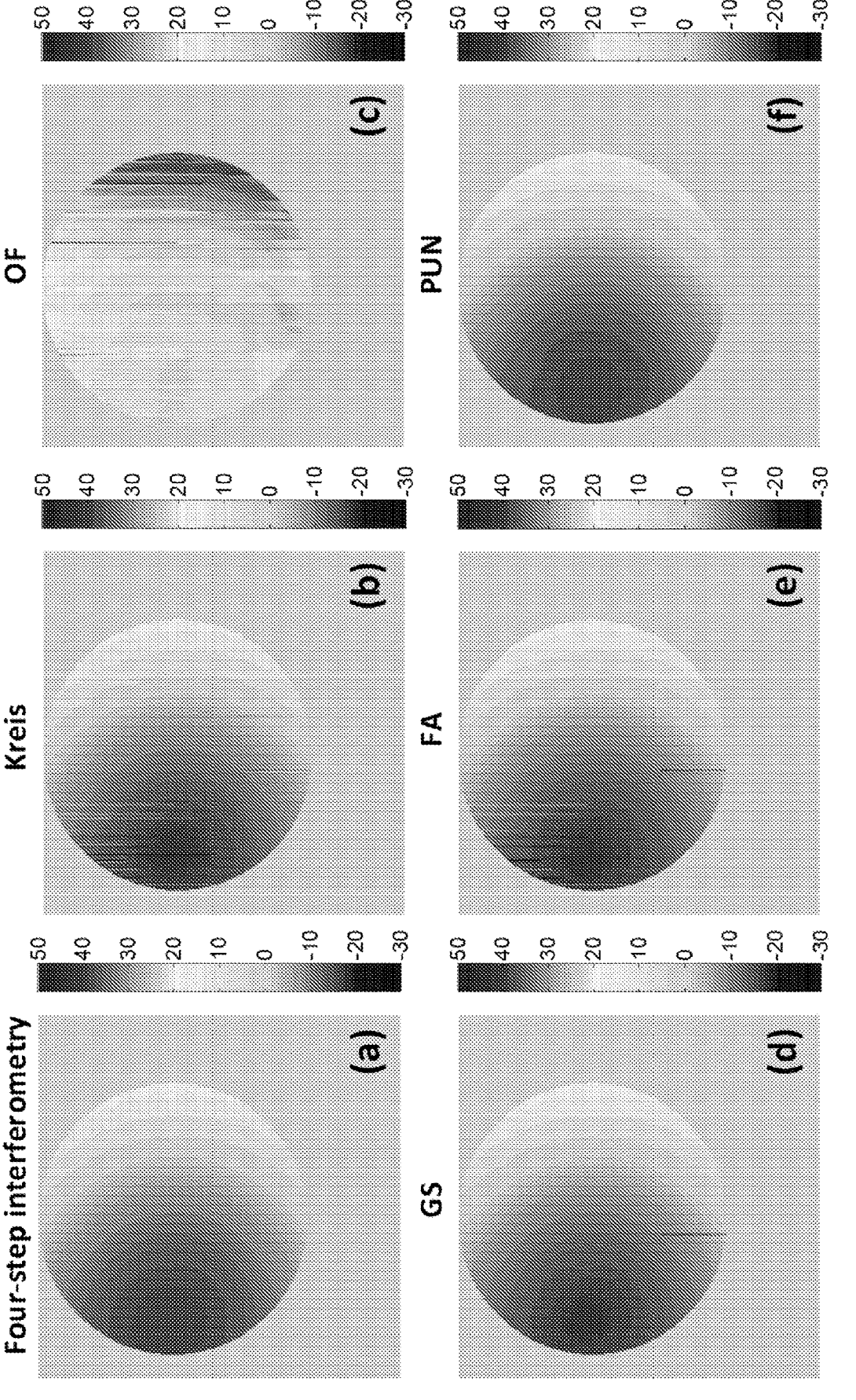
FIG. 11 illustrates example maps of unwrapped phases associated with wrapped phases shown in FIG. 10 for different interferometric techniques.
Figure 12:
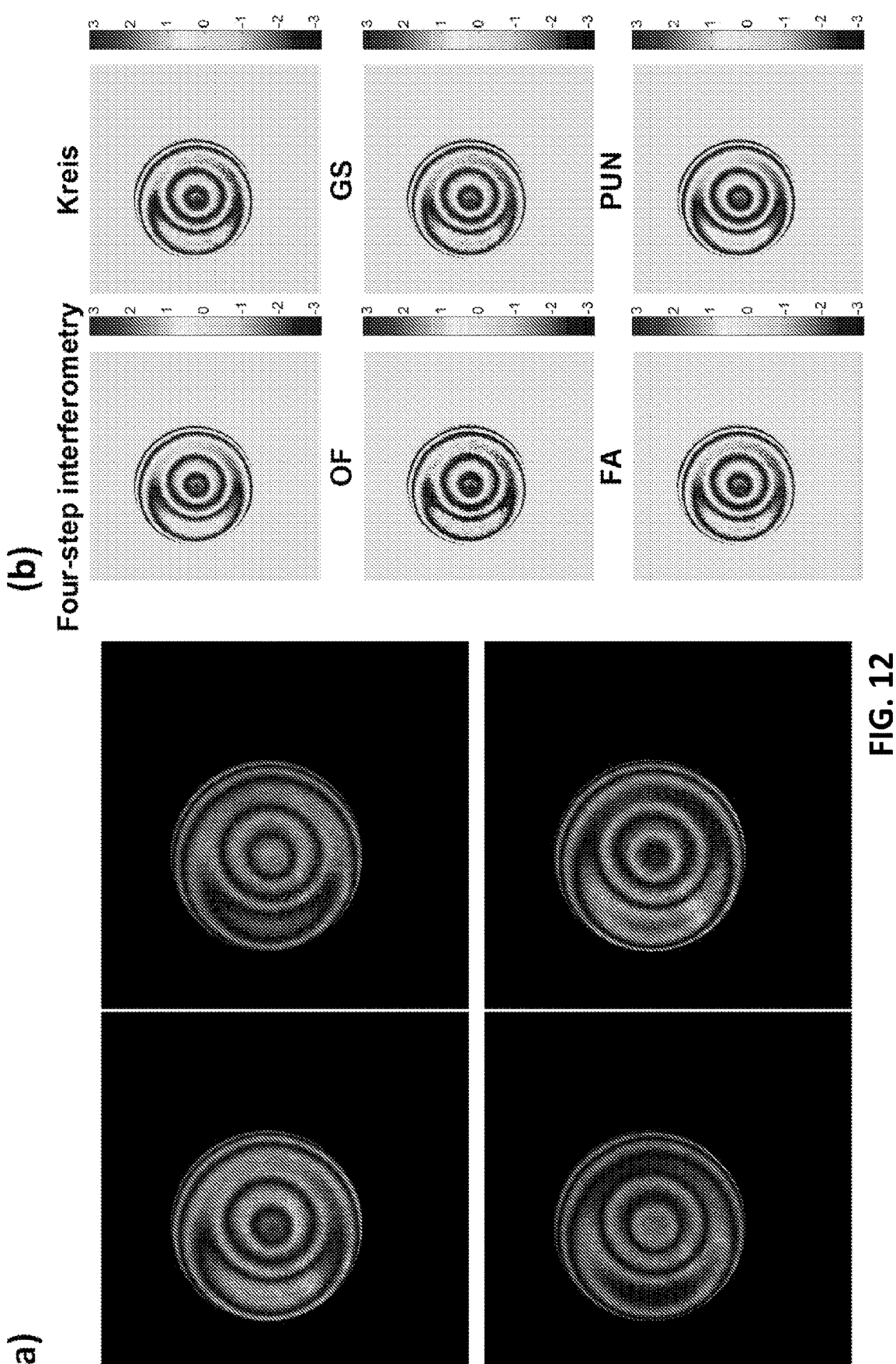
FIG. 12 illustrates another set of example interferograms with $\pi/2$ phase shift in panel (a) and wrapped phases determined according to different interferometric techniques in panel (b).
Figure 13:
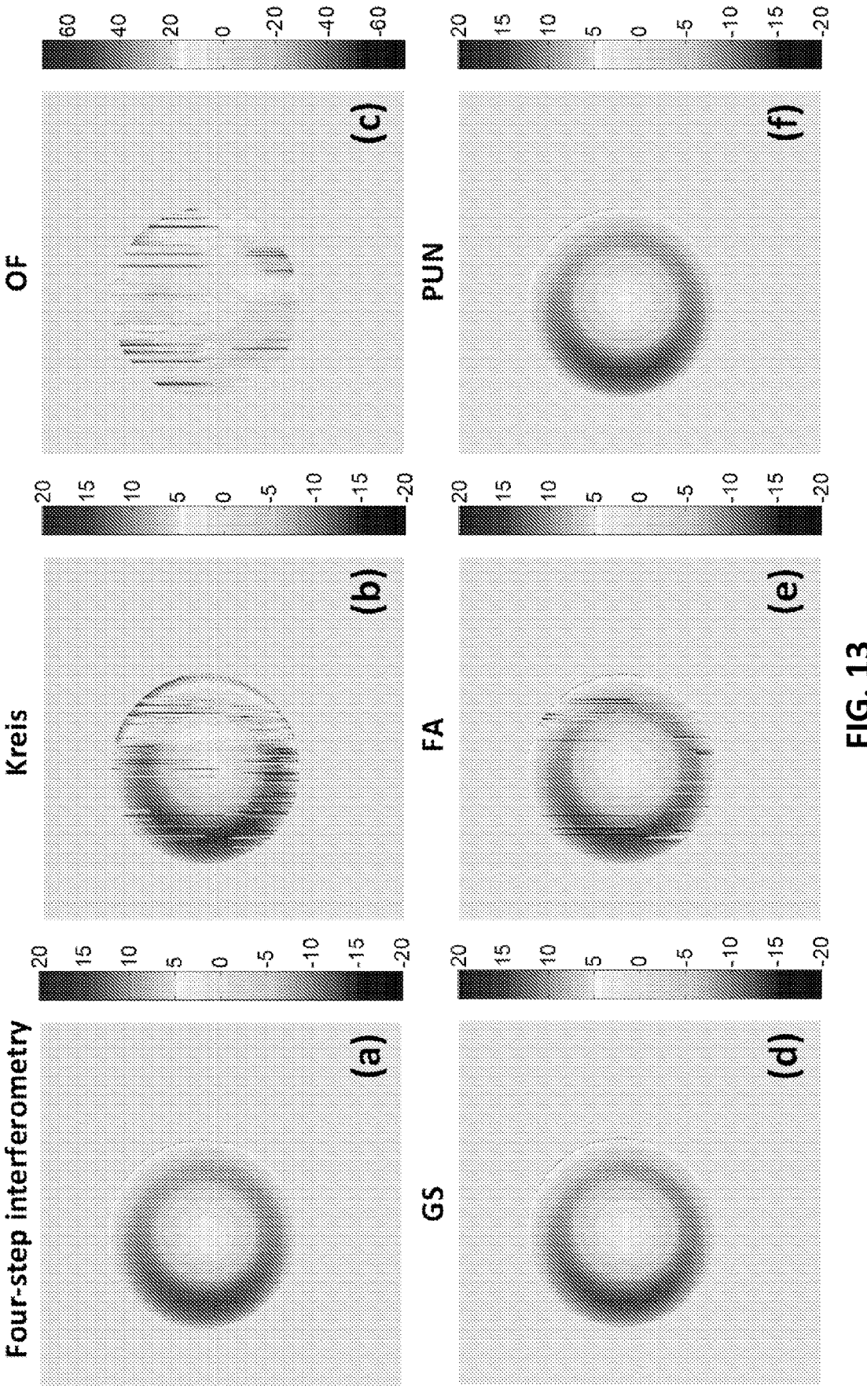
FIG. 13 illustrates example maps of unwrapped phases associated with wrapped phases shown in FIG. 12 for different interferometric techniques.

In order to further verify the effectiveness of the disclosed method, we collected two sets of interferograms in experiments with $\pi/2$ phase step as shown in panel (a) of FIG. 10 and panel (a) of FIG. 12, and calculated the wrapped phases using the standard four-step algorithm as the ground truth as shown in panel (b) of FIG. 10 and panel (b) of FIG. 12. The rest of images in panel (b) of FIG. 10 and FIG. 12 are the wrapped phases calculated from the first two interferograms using prior techniques (Kreis, OF, GS, FA), and the PUN technique disclosed herein. The RMS errors (compared with the four-step algorithm) in panel (b) of FIG. 10 were 0.6485 rad, 1.2680 rad, 0.6590 rad, 0.7231 rad and 0.4007 rad, respectively. And the RMS errors in panel (b) of FIG. 12 were 0.7080 rad, 1.0370 rad, 0.5610 rad, 0.5832 rad and 0.5019 rad, respectively. Then we unwrapped the wrapped phases using the 'unwrap' function in the MATLAB. As shown in FIG. 11, comparing with the four-step interferometry, the RMS errors of Kreis, OF, GS, FA, and PUN after unwrapping were 0.7172 rad, 11.3122 rad, 0.2917 rad, 0.5061 rad and 0.1681 rad, respectively. And in FIG. 13, the RMS errors after unwrapping were 1.9243 rad, 6.5721 rad, 0.1975 rad, 0.8105 rad and 0.1688 rad, respectively. Although the standard four-step interferometry cannot actually be the ground truth, it can be seen reliable regardless of the noise in interferograms. These results illustrate improved RMS error obtained from the PUN technique. Therefore, the PUN results can be seen more accurate than the other two-frame interferometry algorithms.

One aspect of the disclosed embodiments relates to an interferometric system for measuring surface characteristics of an object. The interferometric system includes a collimator positioned to receive light from a first light source having a first wavelength or first range of wavelengths, and from a second light source having light with a smaller coherence length than light from the first light source, and a second wavelength or second range of wavelengths different from the first wavelength or first range of wavelengths. The interferometric system is configured to selectively allow light from one of the light sources to reach the collimator at a given time, and further includes a beamsplitter, and a Mirau type microscope configuration including an objective lens, a plate with a central reflective spot and a beamsplitter plate to produce a reference beam and a test beam for illuminating the object. The interferometric system further includes an imaging lens positioned to receive the test beam and the reference beam, where light from the test and reference beams upon reaching an image plane of the imaging lens form a plurality of interferograms at the image plane. The interferometric system additionally includes an image processing unit including a processor and a memory with instructions stored thereon. The instructions upon execution by the processor cause the processor to use an artificial neural network configured to receive two of the plurality of interferograms associated with the first light source to enable a measurement of a surface shape of the object and to receive another two of the plurality of interferograms associated with the second light source to enable a measurement of a surface roughness of the object.

In one example embodiment, the interferometric system includes a short pass filter positioned at one side of the beamsplitter to produce the reference beam associated with the first light source. The beamsplitter plate of the Mirau type microscope configuration is a dichroic beamsplitter plate that allows light associated with the first light source to pass therethrough without substantial reflection. The dichroic beamsplitter plate allows a first portion of the light associated with the second light source to pass therethrough and a second portion of the light associated with the second light source to be reflected therefrom. In another example embodiment, the interferometric system includes a camera positioned at the image plane of the imaging lens; the processor is communicatively coupled to the camera to obtain electrical signals representative of at least a subset of the plurality of the interferograms. In yet another example embodiments, the interferometric system includes the first and the second light sources. In still another example embodiment, the first light source is a laser light source, and the second light source is a light emitting diode.

According to another example embodiment, the interferometric system is configured to measure the surface shape and the surface roughness by switching on or off the first and the second light sources without reconfiguration of components of the interferometric system. In one example embodiment, the interferometric system includes means for moving one or more components of the interferometric system to introduce a relative shift of an axial position of the interferometric system and the object. In another example embodiment, the relative shift introduces a phase shift between the two interferograms, and the relative shift can be selected to have an arbitrary value. In one example embodiment, the means for moving includes one or more of: a computer-controlled mechanical stage, a voice coil actuator, a piezo plate, a piezo tube or a portion of a diamond turning machine.

In another example embodiment, the interferometric system or the object are positioned such that: (a) for making surface roughness measurements, the object is positioned at a focal plane of the objective lens and (b) for making surface shape measurements, light from the objective lens is incident on the object at a normal angle. In another example embodiment, the artificial neural network is configured to implement a loss function based on a mean absolute error. In yet another example embodiment, the artificial neural network does not include a spatial carrier or a filter for subtracting a DC term.

Another aspect of the disclosed embodiments relates to an interferometric system for measuring surface characteristics of an object. The interferometric system includes a collimator positioned to receive light from an LED light source, a beamsplitter, and a Mirau type microscope configuration including an objective lens, a plate with a central reflective spot and a beamsplitter plate to produce a reference beam and a test beam for illuminating the object at a focal plane of the objective lens. The interferometric system also includes an imaging lens positioned to receive the test beam and the reference beam, wherein light from the test and reference beams upon reaching an image plane of the imaging lens form a plurality of interferograms at the image plane. The interferometric system additionally includes an image processing unit comprising a processor and a memory with instructions stored thereon, wherein the instructions upon execution by the processor cause the processor to use an artificial neural network configured to receive two of the plurality of interferograms and to enable a measurement of a surface roughness of the object based on the two interferograms.

Another aspect of the disclosed embodiments relates to an interferometric system for measuring surface characteristics of an object. The interferometric system includes a collimator positioned to receive light from a laser light source, a beamsplitter, a reference reflective surface positioned at one side of the beamsplitter, and an objective lens to receive light from the laser light source after passing through the beamsplitter for illuminating the object. The interferometric system also includes an imaging lens positioned to receive the test beam and the reference beam, wherein light from the test and reference beams upon reaching an image plane of the imaging lens form a plurality of interferograms at the image plane; the reference beam is produced from light from the light source that enters the beamsplitter, is directed onto and subsequently reflected from the reference reflective surface, interferometric system further includes an image processing unit comprising a processor and a memory with instructions stored thereon. The instructions upon execution by the processor cause the processor to use an artificial neural network configured to receive two of the plurality of interferograms and to enable a measurement of a surface shape of the object based on the two interferograms.

Another aspect of the disclosed embodiments relates to an interferometric system for measuring surface characteristics of an object. The interferometric system includes a collimator positioned to receive light from a first light source having a first wavelength or first range of wavelengths, and from a second light source having light with a smaller coherence length than light from the first light source, and a second wavelength or second range of wavelengths different from the first wavelength or first range of wavelengths. The interferometric system is configured to selectively allow light from one of the light sources to reach the collimator at a given time and also includes a polarizer to receive light from the collimator, a beamsplitter and a quarter wave plate positioned at one side of the beam splitter, and a Mirau type microscope configuration including an objective lens, a plate with a central reflective spot and a polarization beamsplitter plate to produce a reference beam and a test beam for illuminating the object. The interferometric system also includes an imaging lens positioned to receive the test beam and the reference beam, wherein light from the test and reference beams upon reaching an image plane of the imaging lens form a plurality of interferograms at the image plane. The interferometric system further includes an image processing unit comprising a processor and a memory with instructions stored thereon. The instructions upon execution by the processor cause the processor to use an artificial neural network configured to receive two of the plurality of interferograms associated with each of the first and the second light sources and to enable a measurement of both a surface shape and a surface roughness of the object based on the interferograms associated with the first light source and the second light source, respectively.

Another aspect of the disclosed embodiments relates to an interferometric system for measuring surface characteristics of an object. The interferometric system includes a collimator positioned to receive light from a first light source having a first wavelength or first range of wavelengths, and from a second light source having light with a smaller coherence length than light from the first light source, and a second wavelength or second range of wavelengths different from the first wavelength or first range of wavelengths. The interferometric system is configured to selectively allow light from one of the light sources to reach the collimator at a given time and includes a polarizer to receive light from the collimator, a beamsplitter and a quarter wave plate positioned on one side of the beam splitter, and a polarization beamsplitter and a short pass filter positioned at a first side of the polarization beamsplitter. The interferometric system also includes a compensation plate positioned at a second side of the polarization beamsplitter, a first objective lens to produce focused light for illuminating the object, and a second objective lens positioned between the short pass filter and a reflective surface such that light after passing though the short pass filter reaches the second objective, is directed to the reflective surface, is reflected from the reflective surface, passes through the second objective and reaches the short pass filter. The interferometric system further includes an imaging lens positioned to receive the test beam and the reference beam, wherein light from the test and reference beams upon reaching an image plane of the imaging lens form a plurality of interferograms at the image plane. The interferometric system additionally includes an image processing unit comprising a processor and a memory with instructions stored thereon. The instructions upon execution by the processor cause the processor to use an artificial neural network configured to receive two of the plurality of interferograms associated with each of the first and the second light sources and to enable a measurement of both a surface shape and a surface roughness of the object based on the interferograms associated with the first light source and the second light source, respectively. In one example embodiment, a polarization camera that is communicatively coupled to the image processing unit. In another example embodiment, the first and the second light sources. For example, the first light source is a laser light source, and the second light source is a light emitting diode. In another example embodiment, the artificial neural network is configured to implement a loss function based on a mean absolute error.

Figure 14:
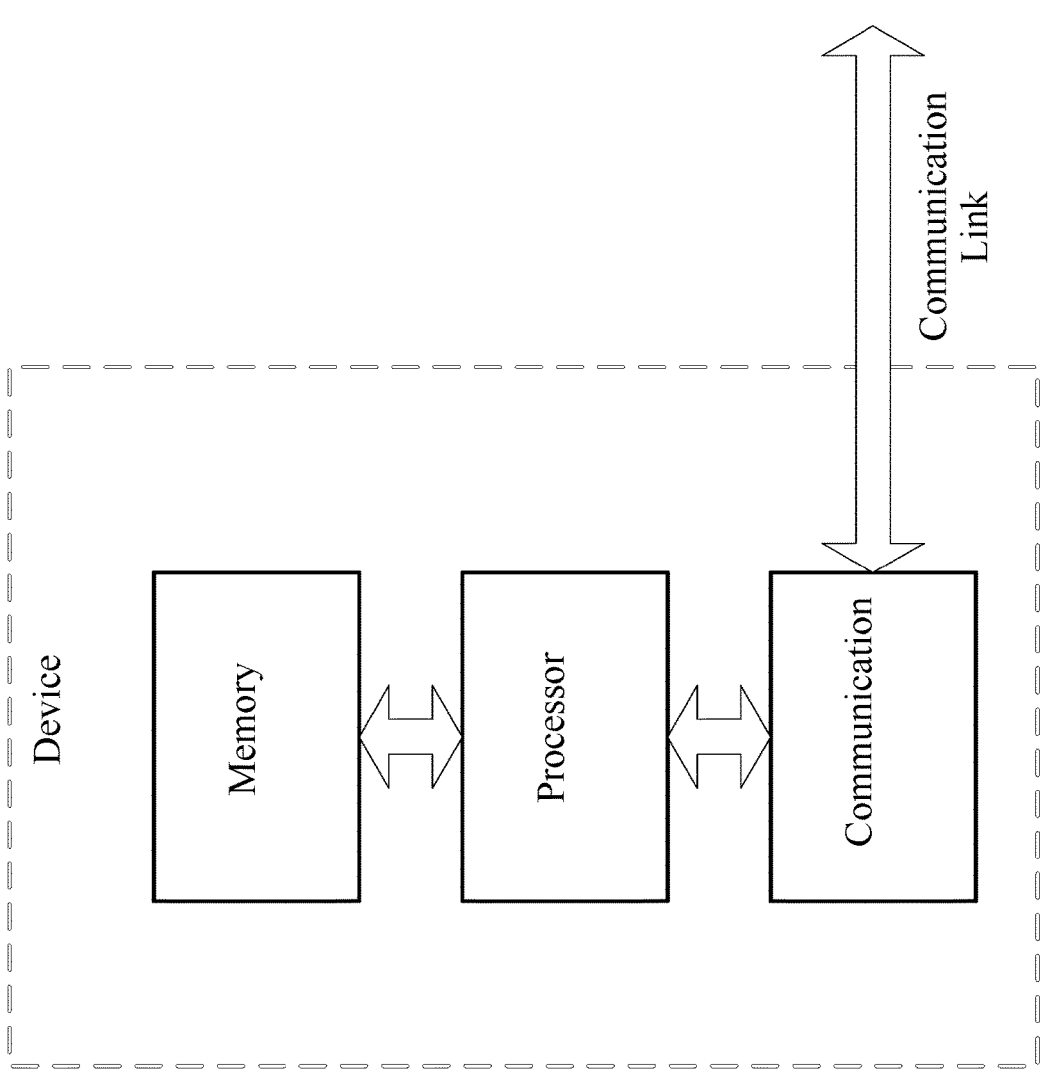
FIG. 14 illustrates a block diagram of various components that can be used to control the operations of the disclosed system in accordance with some example embodiments.

FIG. 14 illustrates a block diagram of various components that can be used to control the operations of the disclosed system in accordance with some example embodiments. In particular, a processer/controller can be configured to communicate with one or more imaging sensors and one or more light sources. In embodiments, where actuators or translation stages or other components for moving/shifting/tilting/rotating are used, the processer/controller can be configured to communicate with, and control the operations of, those components. The processor/controller can further include, or be couple to, a memory that stores processor executable code that causes the processor/controller to generate and transmit/receive suitable information to/from the various system components, as well as suitable input/output (IO) capabilities (e.g., wired or wireless) to transmit and receive commands and/or data with to and from the active components/devices, the imaging sensors, cameras and the light sources. The processor/controller may receive the information associated with images or interferogram captured by the imaging sensors or cameras, and further process that information to produce data indicative of surface roughness or shape of the test surfaces, as well as images or other data that can be displayed and/or further processed. In some embodiments, the processor/controller can be configured to implement the neural networks disclosed herein.

Various information and data processing operations described herein may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media that is described in the present application comprises non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Only a few implementations and examples are described and other implementations, enhancements and variations can be made based on what is described and illustrated in this patent document.

What is claimed is:

1. An interferometric system for measuring surface characteristics of an object, the interferometric system comprising:

a collimator positioned to receive light from a first light source having a first wavelength or a first range of wavelengths, and from a second light source having light with a smaller coherence length than light from the first light source and having a second wavelength or a second range of wavelengths different from the first wavelength or first range of wavelengths, the interferometric system configured to selectively allow light from one of the light sources to reach the collimator at a given time;

a beamsplitter;

a Mirau type microscope configuration including an objective lens, a plate with a central reflective spot and a beamsplitter plate to produce a reference beam and a test beam for illuminating the object;

an imaging lens positioned to receive the test beam and the reference beam, wherein light from the test and reference beams upon reaching an image plane of the imaging lens form a plurality of interferograms at the image plane; and an image processing unit comprising a processor and a memory with instructions stored thereon, wherein the instructions upon execution by the processor cause the processor to use an artificial neural network configured to receive two of the plurality of interferograms associated with the first light source and produce a first wrapped phase from the two interferograms to enable a measurement of a surface shape of the object and to receive two other interferograms of the plurality of interferograms associated with the second light source and produce a second wrapped phase from the two other interferograms to enable a measurement of a surface roughness of the object.

2. The interferometric system of claim 1, comprising a camera positioned at the image plane of the imaging lens, wherein the processor is communicatively coupled to the camera to obtain electrical signals representative of at least a subset of the plurality of the interferograms.

3. The interferometric system of claim 1, comprising the first and the second light sources.

4. The interferometric system of claim 1, wherein the first light source is a laser light source, and the second light source is a light emitting diode.

5. The interferometric system of claim 1, configured to measure the surface shape and the surface roughness by switching on or off the first and the second light sources without reconfiguration of components of the interferometric system.

6. The interferometric system of claim 1, comprising means for moving one or more components of the interferometric system to introduce a relative shift of an axial position of the interferometric system and the object.

7. The interferometric system of claim 6, wherein the relative shift introduces a phase shift between the two interferograms, and wherein the relative shift can be selected to have an arbitrary value.

8. The interferometric system of claim 6, wherein the means for moving includes one or more of: a computer-controlled mechanical stage, a voice coil actuator, a piezo plate, a piezo tube or a portion of a diamond turning machine.

9. The interferometric system of claim 1, wherein the interferometric system or the object are positioned such that: (a) for making surface roughness measurements, the object is positioned at a focal plane of the objective lens and (b) for making surface shape measurements, light from the objective lens is incident on the object at a normal angle.

10. The interferometric system of claim 1, wherein the artificial neural network is configured to implement a loss function based on a mean absolute error.

11. An interferometric system for measuring surface characteristics of an object, the interferometric system comprising:

a collimator positioned to receive light from a first light source having a first wavelength or a first range of wavelengths, and from a second light source having light with a smaller coherence length than light from the first light source and having a second wavelength or a second range of wavelengths different from the first wavelength or first range of wavelengths, the interferometric system configured to selectively allow light from one of the light sources to reach the collimator at a given time;

a beamsplitter;

a Mirau type microscope configuration including an objective lens, a plate with a central reflective spot and a beamsplitter plate to produce a reference beam and a test beam for illuminating the object;

an imaging lens positioned to receive the test beam and the reference beam, wherein light from the test and reference beams upon reaching an image plane of the imaging lens form a plurality of interferograms at the image plane;

an image processing unit comprising a processor and a memory with instructions stored thereon, wherein the instructions upon execution by the processor cause the processor to use an artificial neural network configured to receive two of the plurality of interferograms associated with the first light source to enable a measurement of a surface shape of the object and to receive another two of the plurality of interferograms associated with the second light source to enable a measurement of a surface roughness of the object; and a short pass filter positioned at one side of the beamsplitter to produce the reference beam associated with the first light source, wherein the beamsplitter plate of the Mirau type microscope configuration is a dichroic beamsplitter plate that allows light associated with the first light source to pass therethrough without substantial reflection, the dichroic beamsplitter plate allowing a first portion of the light associated with the second light source to pass therethrough and a second portion of the light associated with the second light source to be reflected therefrom.

12. The interferometric system of claim 11, comprising a camera positioned at the image plane of the imaging lens, wherein the processor is communicatively coupled to the camera to obtain electrical signals representative of at least a subset of the plurality of the interferograms.

13. The interferometric system of claim 11, comprising the first and the second light sources.

14. The interferometric system of claim 11, wherein the first light source is a laser light source, and the second light source is a light emitting diode.

15. The interferometric system of claim 11, configured to measure the surface shape and the surface roughness by switching on or off the first and the second light sources without reconfiguration of components of the interferometric system.

16. The interferometric system of claim 11, comprising means for moving one or more components of the interferometric system to introduce a relative shift of an axial position of the interferometric system and the object.

US 12,578,180 B2

17

17. The interferometric system of claim 16, wherein the relative shift introduces a phase shift between the two interferograms, and wherein the relative shift can be selected to have an arbitrary value.

18. The interferometric system of claim 16, wherein the means for moving includes one or more of: a computer-controlled mechanical stage, a voice coil actuator, a piezo plate, a piezo tube or a portion of a diamond turning machine.

19. The interferometric system of claim 11, wherein the interferometric system or the object are positioned such that: (a) for making surface roughness measurements, the object is positioned at a focal plane of the objective lens and (b) for making surface shape measurements, light from the objective lens is incident on the object at a normal angle.

20. The interferometric system of claim 11, wherein the artificial neural network is configured to implement a loss function based on a mean absolute error.

\* \* \* \* \*